United States Patent
Yin et al.

(10) Patent No.: US 11,706,766 B2
(45) Date of Patent: Jul. 18, 2023

(54) PUCCH COLLISION HANDLING FOR MULTI-SLOT LONG PUCCH IN 5G NR

(71) Applicant: Sharp Kabushiki Kaisha, Sakai (JP)

(72) Inventors: Zhanping Yin, Vancouver, WA (US); Tatsushi Aiba, Osaka (JP); Toshizo Nogami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/968,722

(22) PCT Filed: Feb. 12, 2019

(86) PCT No.: PCT/US2019/017615
§ 371 (c)(1),
(2) Date: Aug. 10, 2020

(87) PCT Pub. No.: WO2019/160846
PCT Pub. Date: Aug. 22, 2019

(65) Prior Publication Data
US 2020/0404692 A1    Dec. 24, 2020

Related U.S. Application Data

(60) Provisional application No. 62/631,280, filed on Feb. 15, 2018.

(51) Int. Cl.
*H04W 72/12* (2023.01)
*H04W 72/21* (2023.01)
*H04L 1/1867* (2023.01)

(52) U.S. Cl.
CPC .......... *H04W 72/21* (2023.01); *H04L 1/1887* (2013.01); *H04L 1/1896* (2013.01)

(58) Field of Classification Search
CPC ... H04L 1/1819; H04L 5/0055; H04L 1/0026; H04L 25/0226; H04L 5/0051;
(Continued)

(56) References Cited

U.S. PATENT DOCUMENTS

2013/0308503 A1* 11/2013 Kim ............... H04L 5/0053
370/280
2016/0094996 A1* 3/2016 Xiong ............... H04W 16/14
370/329
(Continued)

FOREIGN PATENT DOCUMENTS

EP    3755088 A1 * 12/2020 .............. F28F 1/325

OTHER PUBLICATIONS

3GPP TS 38.211 V15.1.0, 3rd Generation Partnership Project; Technical Specification Group Radio Access Network; NR; Physical channels and modulation (Release 15), Mar. 2018.
(Continued)

*Primary Examiner* — Phuc H Tran
(74) *Attorney, Agent, or Firm* — Austin Rapp

(57) ABSTRACT

A user equipment (UE) is described. The UE includes receiving circuitry configured to receive a first parameter. The receiving circuitry is also configured to receive a second parameter. The UE also includes transmitting circuitry configured to perform, based on the first parameter, the first PUCCH repetitions in first multiple slots. The transmitting circuitry is also configured to perform, based on the second parameter, the second PUCCH receptions in second multiple slot. For a case that the first PUCCH repetitions collide with the second PUCCH receptions, a priority for different types of uplink control information (UCI) is applied. Hybrid automatic repeat request-acknowledgment (HARQ-ACK) has a higher priority than a scheduling request (SR) and channel state information (CSI). The SR has a higher priority than the CSI.

8 Claims, 23 Drawing Sheets

(58) Field of Classification Search
CPC ... H04L 1/0027; H04L 1/0031; H04L 1/0073; H04L 5/0044; H04L 5/0048; H04L 1/1671; H04L 1/1854; H04L 1/1887; H04L 1/1896; H04L 5/0053; H04W 72/1242; H04W 72/1284

See application file for complete search history.

(56) References Cited

U.S. PATENT DOCUMENTS

| | | | |
|---|---|---|---|
| 2017/0064640 | A1 | 3/2017 | Yang et al. |
| 2018/0019843 | A1* | 1/2018 | Papasakellariou .... H04L 1/1812 |
| 2018/0176902 | A1* | 6/2018 | Huang .............. H04W 72/0413 |
| 2018/0220413 | A1* | 8/2018 | Yang ..................... H04L 1/0041 |
| 2019/0335485 | A1* | 10/2019 | Kundu ................. H04L 1/0031 |
| 2020/0137752 | A1* | 4/2020 | Parkvall .............. H04W 72/042 |
| 2020/0154496 | A1* | 5/2020 | Yi ......................... H04W 76/15 |
| 2021/0007119 | A1* | 1/2021 | Li ..................... H04W 72/0446 |

OTHER PUBLICATIONS

3GPP TS 38.213, V15.1.0, 3rd Generation Partnership Project; Technical Specification Group Radio Access Network; NR; Physical layer procedures for control (Release 15), Mar. 2018.

Samsung, "Update on Summary of Collision Handling Aspects for LC/CE UEs", 3GPP TSG RAN WG1 #84, St Julians, Malta, R1-161377, Feb. 19, 2016.

Vivo, Potevio, "Remaining issues on long PUCCH", 3GPP TSG RAN WG1 Meeting AH 1801, Vancouver, Canada, R1-1800201, Jan. 26, 2018.

Nokia, Nokia Shanghai Bell, "Remaining details on PUCCH structure in long duration", 3GPP TSG-RAN WG1 #AH1801, Vancouver, BC, Canada, R1-1800559, Jan. 26, 2018.

* cited by examiner

PUCCH COLLISION HANDLING FOR MULTI-SLOT LONG PUCCH IN 5G NR

RELATED APPLICATIONS

This application is related to and claims priority from U.S. Provisional Patent Application No. 62/631,280, entitled "PUCCH COLLISION HANDLING FOR MULTI-SLOT LONG PUCCH IN 5G NR," filed on Feb. 15, 2018, which is hereby incorporated by reference herein, in its entirety.

TECHNICAL FIELD

The present disclosure relates generally to communication systems. More specifically, the present disclosure relates to physical uplink control channel (PUCCH) collision handling for multi-slot long PUCCH in 5G New Radio (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
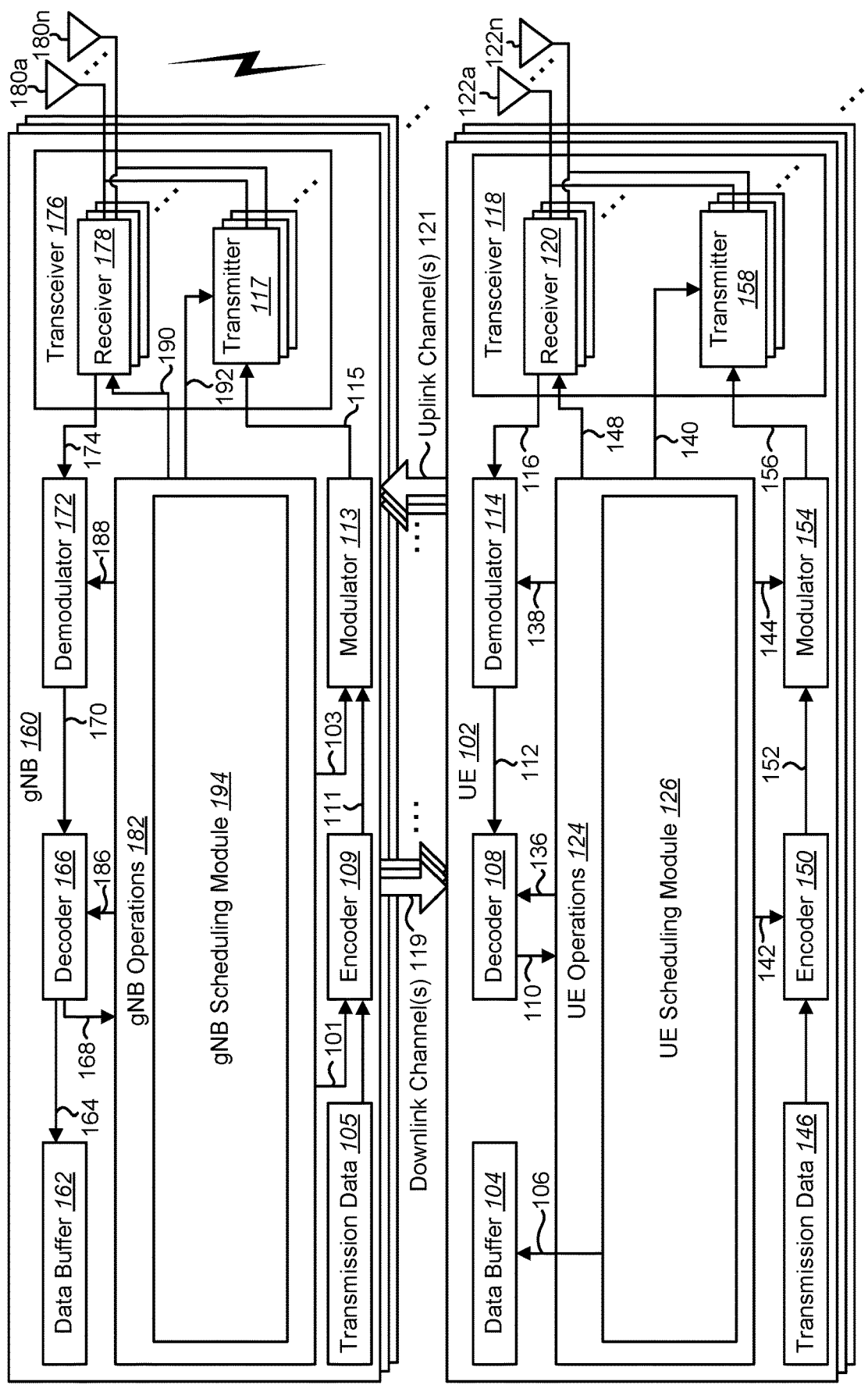
FIG. 1 is a block diagram illustrating one implementation of one or more gNBs and one or more UEs in which systems and methods for physical uplink control channel (PUCCH) collision handling for multi-slot long PUCCH may be implemented.

A user equipment (UE) is described. The UE includes receiving circuitry configured to receive a first parameter used for configuring a number of slots for a first physical uplink control channel (PUCCH) repetitions. The receiving circuitry is also configured to receive a second parameter used for configuring a number of slots for second PUCCH repetitions. The UE also includes transmitting circuitry configured to perform, based on the first parameter, the first PUCCH repetitions in first multiple slots, wherein each transmission of the first PUCCH repetitions is performed in the same location within each slot of the first multiple slots. The transmitting circuitry is also configured to perform, based on the second parameter, the second PUCCH repetitions in second multiple slots, wherein each transmission of the second PUCCH repetitions is performed in the same location within each slot of the second multiple slots. For a case that the first PUCCH repetitions collide with the second PUCCH repetitions, a priority for different types of uplink control information (UCI) is applied. Hybrid automatic repeat request-acknowledgment (HARQ-ACK) has a higher priority than a scheduling request (SR) and channel state information (CSI). The SR has a higher priority than the CSI.

A base station apparatus is also described. The base station apparatus includes transmitting circuitry configured to transmit a first parameter used for configuring a number of slots for a first physical uplink control channel (PUCCH) repetitions. The transmitting circuitry is also configured to transmit a second parameter used for configuring a number of slots for second PUCCH repetitions. The base station apparatus also includes receiving circuitry configured to receive, based on the first parameter, the first PUCCH repetitions in first multiple slots, wherein each transmission of the first PUCCH repetitions is received in the same location within each slot of the first multiple slots. The receiving circuitry is also configured to receive, based on the second parameter, the second PUCCH repetitions in second multiple slots, wherein each transmission of the second PUCCH repetitions is received in the same location within each slot of the second multiple slots. For a case that the first PUCCH repetitions collide with the second PUCCH repetitions, a priority for different types of uplink control information (UCI) is applied. Hybrid automatic repeat request-acknowledgment (HARQ-ACK) has a higher priority than a scheduling request (SR) and channel state information (CSI). The SR has a higher priority than the CSI.

A communication method of a UE is also described. The method includes receiving a first parameter used for configuring a number of slots for a first physical uplink control channel (PUCCH) repetitions. The method also includes receiving a second parameter used for configuring a number of slots for second PUCCH repetitions. The method also includes performing, based on the first parameter, the first PUCCH repetitions in first multiple slots, wherein each transmission of the first PUCCH repetitions is performed in the same location within each slot of the first multiple slots. The method also includes performing, based on the second parameter, the second PUCCH repetitions in second multiple slots, wherein each transmission of the second PUCCH repetitions is performed in the same location within each slot of the second multiple slots. For a case that the first PUCCH repetitions collide with the second PUCCH repetitions, a priority for different types of uplink control information (UCI) is applied. Hybrid automatic repeat request-acknowledgment (HARQ-ACK) has a higher priority than a scheduling request (SR) and channel state information (CSI). The SR has a higher priority than the CSI.

A communication method of a base station apparatus is also described. The method includes transmitting a first parameter used for configuring a number of slots for a first physical uplink control channel (PUCCH) repetitions. The method also includes transmitting a second parameter used for configuring a number of slots for second PUCCH repetitions. The method also includes receiving, based on the first parameter, the first PUCCH repetitions in first multiple slots, wherein each transmission of the first PUCCH repetitions is received in the same location of each slot of the first multiple slots. The method also includes receiving, based on the second parameter, the second PUCCH repetitions in second multiple slots, wherein each transmission of the second PUCCH repetitions is received in the same location of each slot of the second multiple slots. For a case that the first PUCCH repetitions collide with the second PUCCH repetitions, a priority for different types of uplink control information (UCI) is applied. Hybrid automatic repeat request-acknowledgment (HARQ-ACK) has a higher priority than a scheduling request (SR) and channel state information (CSI). The SR has a higher priority than the CSI.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NW" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In NR, multiple PUCCH formats are defined that can be used to report various UCI. In some instances, multiple UCI may be reported on different PUCCHs in the same slot with partial or fully overlap between them. Different rules may be applied to handle the partial and fully PUCCH overlapping cases for different combinations of UCI contents. In general, the rules can be classified into two cases. In a first case, the UCI can be multiplexed and reported on a single PUCCH. In this case, the UCI payload of the PUCCH will be increased, and the same or different PUCCH resource may be used to report the aggregated UCI. In a second case, the UCI cannot be multiplexed, thus, some partial or fully PUCCH dropping rules have to be specified. In this case, at least part or all the PUCCH for some UCI may be dropped.

The systems and methods described herein, include potential methods of the two approaches. Then, a special case is described when a UCI is reported on a multi-slot PUCCH (i.e., a long PUCCH configured with repetition or a long PUCCH configuration with multi-slot transmission). If a UCI is carried with a long PUCCH with multi-slot transmission, and a partial or fully overlapping occurs with another PUCCH carrying a different UCI, the long PUCCH with multi-slot transmission can be dropped and postponed to a later slot, and the PUCCH carrying the other UCI should be transmitted. This avoids the potential PUCCH format and/or resource modifications in case of UCI multiplexing is supported, and avoids PUCCH dropping in case of UCI multiplexing is not supported. Therefore, it provides better UCI report performance because no UCI is dropped, and no PUCCH format is modified.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for physical uplink control channel (PUCCH) collision handling for multi-slot long PUCCH may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform simultaneous HARQ-ACK and SR transmission on an NR PUCCH. In a first aspect, NR PUCCH formats and UCI reporting are described. The physical uplink control channel supports multiple formats as shown in Table 1.

TABLE 1

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

As given in Table 1, NR defines multiple PUCCH formats. Short PUCCH may be 1-2 symbols. Short PUCCH may include Format 0 (less than or equal to 2 bits, sequence based) and/or Format 2 (more than 2 bits, OFDM based). Long PUCCH may be greater than or equal to 4 symbols. Long PUCCH may include Format 1 (less than or equal to 2 bits, sequence based), Format 3 (more than 2 bits, DFT-S-OFDM based, no UE multiplexing) and/or Format 4 (more than 2 bits, DFT-S-OFDM based, with UE multiplexing).

If a UE 102 is not transmitting PUSCH, and the UE 102 is transmitting UCI, the UE 102 may transmit UCI on PUCCH format 0 if the transmission is over 1 symbol or 2 symbols and/or the number of UCI bits is 1 or 2. The UE 102 may transmit UCI on PUCCH format 1 if the transmission is over 4 or more symbols and/or the number of UCI bits is 1 or 2. The UE 102 may transmit UCI on PUCCH format 2 if the transmission is over 1 symbol or 2 symbols and/or the number of UCI bits is more than 2. The UE 102 may transmit UCI on PUCCH format 3 if the transmission is over 4 or more symbols and/or the number of UCI bits is more than 2. The UE 102 may transmit UCI on PUCCH format 4 if the transmission is over 4 or more symbols; the number of UCI bits is more than 2 and/or a PUCCH resource includes an orthogonal cover code.

For PUCCH format 3 or for PUCCH format 4, a UE 102 can be configured by higher layer parameter PUCCH-F3-F4-additional-DMRS, a number of symbols used for DMRS.

For PUCCH formats 1, 3, or 4, a UE can be configured a number of slots, $N_{PUCCH}^{repeat}$, for a PUCCH transmission by respective higher layer parameters PUCCH-F1-number-of-slots, PUCCH-F3-number-of-slots, or PUCCH-F4-number-of-slots.

For $N_{PUCCH}^{repeat}>1$ the UE 102 may repeat the UCI in the PUCCH transmission in the first slot of the $N_{PUCCH}^{repeat}$ slots in the PUCCH transmission in each of the remaining $N_{PUCCH}^{repeat}-1$ slots. A PUCCH transmission may have the same number of consecutive symbol, as provided by higher layer parameter PUCCH-F1-F3-F4-number-of-symbols, in each of the $N_{PUCCH}^{repeat}$ slots. A PUCCH transmission may have a same first symbol, as provided by higher layer parameter PUCCH-F1-F3-F4-starting-symbol, in each of the $N_{PUCCH}^{repeat}$ slots.

For $N_{PUCCH}^{repeat}>1$, the UE 102 may be configured by higher layer parameter PUCCH-F1-F3-F4-interslot-FH whether or not to perform frequency hopping for PUCCH transmissions in different slots. If PUCCH-F1-F3-F4-interslot-FH=ON, a first PRB for PUCCH transmission is provided by higher layer parameter PUCCH-starting-PRB and a second PRB for PUCCH transmission is provided by higher layer parameter PUCCH-2nd-hop-PRB.

For $N_{PUCCH}^{repeat}>1$, if the UE 102 is configured to perform frequency hopping for PUCCH transmissions in different slots, the UE 102 may perform frequency hopping per slot and/or the UE 102 is not expected to be configured to perform frequency hopping for a PUCCH transmission within a slot.

If a UE 102 is provided higher layer parameter UL-DL-configuration-common or is additionally provided higher layer parameter UL-DL-configuration-dedicated for the slot format per slot over the number of slots, the UE 102 may determine the $N_{PUCCH}^{repeat}$ slots for a PUCCH transmission as the first slots starting from a slot indicated to the UE 102 and having an UL symbol for a symbol provided by higher layer parameter PUCCH-F1-F3-F4-starting-symbol is an UL symbol, and consecutive UL symbols, starting from the symbol, equal to a number of symbols provided higher layer parameter PUCCH-F1-F3-F4-number-of-symbols.

If a UE 102 is not provided higher layer parameter UL-DL-configuration-common, the UE 102 may determine the $N_{PUCCH}^{repeat}$ slots for a PUCCH transmission as the $N_{PUCCH}^{repeat}$ consecutive slots starting from a slot indicated to the UE 102.

Based on the description above, for long PUCCH format 1, 3 and 4, multi-slot transmission is supported by configuring the number of slots (nrofSlots) for PUCCH repetition or multi-slot transmission. The nrofSlots parameter may be chosen among the value set of {1,2,4,8}. The nrofSlots parameter may be configured per long PUCCH format (i.e., PUCCH 1, 3, and 4).

For a multi-slot long PUCCH transmission, the PUCCH format resource (i.e., RB location, number of symbols, etc.) may be determined by the initial PUCCH transmission. In each consecutive PUCCH transmission, the same PUCCH location within a slot is used. The PUCCH transmission may repeat until the configured number of slots is reached.

The 'unknown' symbols in semi-static DL/UL assignment can be used for long PUCCH transmission over multiple slots when a UE receives a grant to transmit the long PUCCH. During the PUCCH repetition, if there are not enough symbols for the long PUCCH location and duration in a slot, the long PUCCH is not transmitted in the given slot, the repetition will be performed in later slots until the configured number of slots is reached.

In a second aspect, PUCCH collision cases for UCI reporting are described herein. The PUCCH can be used to report different kinds of UCI, including HARQ-ACK, where PUCCH format 0 or 1 can be used if the number of HARQ-ACK bits is up to 2 bits and/or PUCCH format 2 or 3 or 4 can be used if the number of HARQ-ACK bits is more than 2 bits.

PUCCH can be used to report channel state information. CSI may include channel quality indicator (CQI), preceding matrix indicator (PMI), CSI-RS resource indicator (CRI), strongest layer indication (SLI), rank indication (RI) and/or L1-RSRP. A CSI report can be a periodic CSI (P-CSI), semi-persistent CSI or an aperiodic CSI (A-CSI). A CSI may include CSI part 1 and CSI part 2. A CSI PUCCH resource can be PUCCH format 2/3/4. For P-CSI, the PUCCH resource may be semi-statically configured by higher layer signaling. For A-CSI, the PUCCH resource can be dynamically indicated.

PUCCH can be used to report a scheduling request (SR). Multiple SR configurations may be configured for a UE 102. Each SR configuration may be linked to a different traffic type or service. A SR configuration may include a SR PUCCH format and resource, a periodicity and an offset within the periodicity. Since SR only carries one bit, a SR PUCCH resource may be configured with PUCCH format 0 or PUCCH format 1.

The HARQ-ACK is a feedback for a PDSCH transmission, which may be scheduled at any slot. Also CSI and SR may be scheduled with different periodicity. Therefore, multiple UCI instances may be reported in the same slot, and cause a collision between PUCCHs carrying different UCI.

Figure 2:
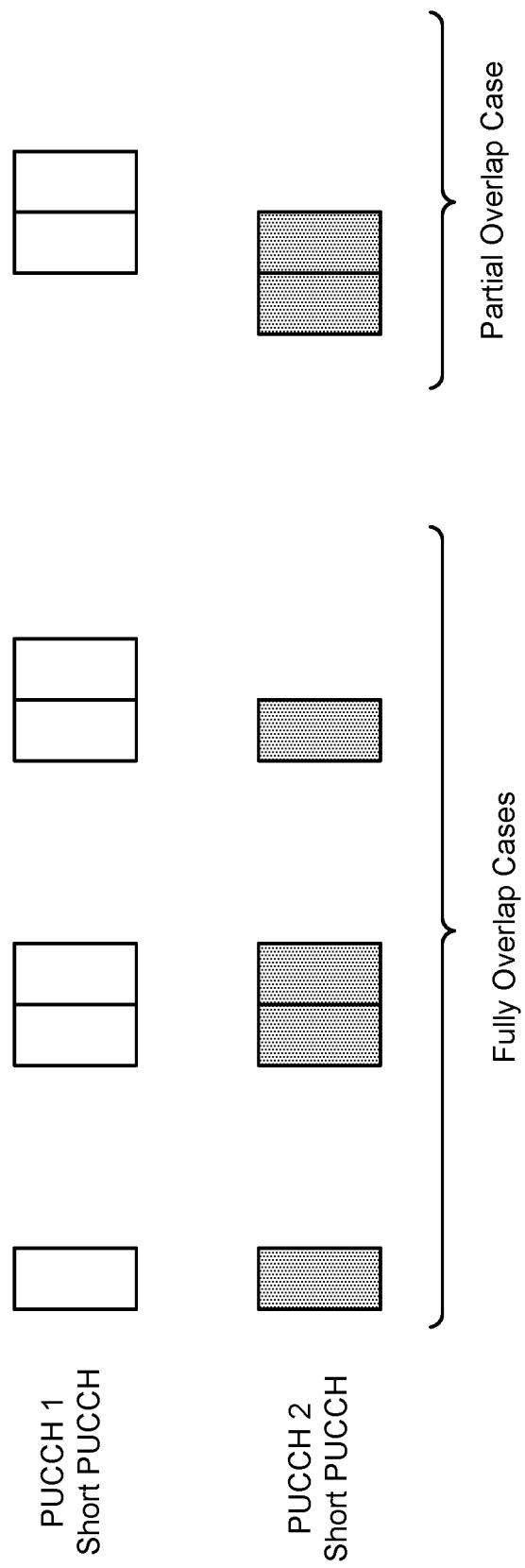
FIG. 2 is an example illustrating combinations of PUCCH collisions between short PUCCH and short PUCCH.
Figure 3:
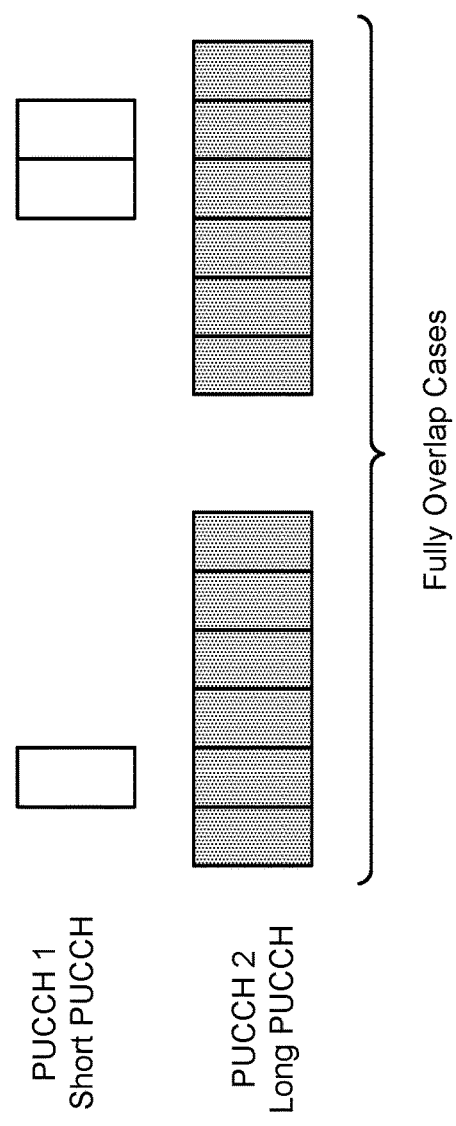
FIG. 3 is an example illustrating combinations of PUCCH collisions between short PUCCH and long PUCCH.
Figure 4:
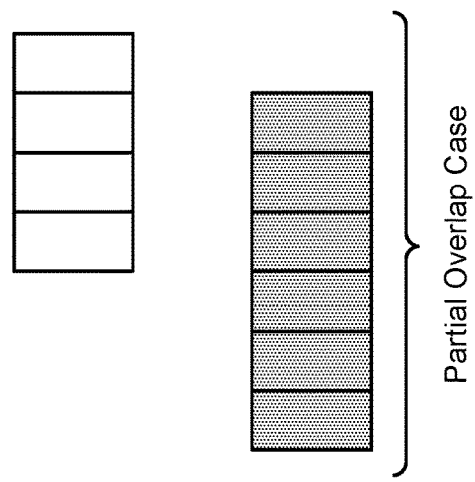
FIG. 4 is an example illustrating combinations of PUCCH collisions between long PUCCH and long PUCCH.
Figure 4:
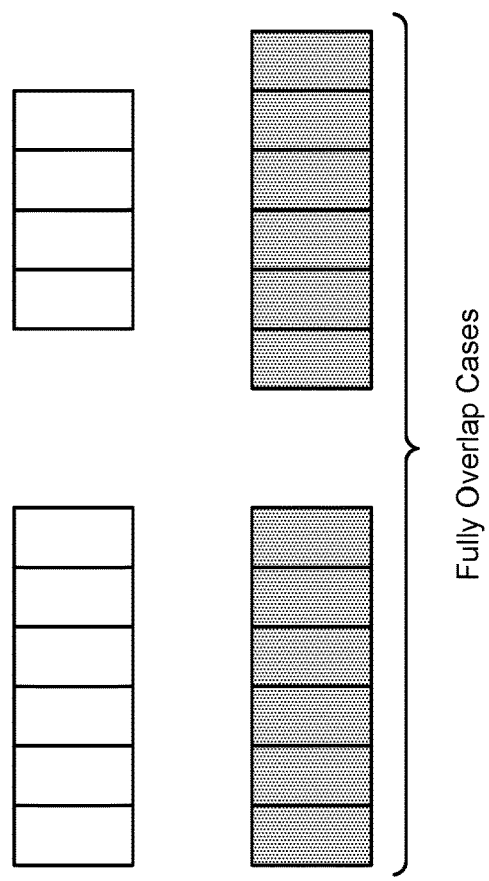

In NR, since multiple PUCCH formats are defined, and the durations of a PUCCH can be configurable, there are many different collision cases between PUCCHs. FIG. 2 illustrates the combinations of PUCCH collisions between short PUCCH and short PUCCH. FIG. 3 illustrates the combinations of PUCCH collisions between short PUCCH and long PUCCH. FIG. 4 illustrates the combinations of PUCCH collisions between long PUCCH and long PUCCH.

For the collision cases, the PUCCHs can be fully overlapped (i.e., one PUCCH occupies the same symbols or is contained within another PUCCH). The PUCCHs can be partial overlapped (i.e., some symbols of one PUCCH overlaps with another PUCCH). For both fully overlap and partial overlap cases, the number of overlapping symbols can be different based on the durations and the relative starting positions of the PUCCHs. It is neither feasible nor necessary to define different behaviors for each combination.

In general, two methods can be considered in case of UCI transmission with PUCCH collision. Comparatively, the CSI report is not as time sensitive as HARQ-ACK reporting. Periodic CSI is configured by RRC and the report timing is known in advance. Aperiodic CSI on PUCCH is triggered by DL DCI and should be known well before the PUCCH reporting based on the minimum processing time. Furthermore, the gNB should be able to avoid the collision between HARQ-ACK and A-CSI reporting. Therefore, in case of collision between a PUCCH for HARQ-ACK and PUCCH for CSI reporting, the CSI content should be known at the time of HARQ-ACK PUCCH transmission. And simultaneous HARQ-ACK and CSI transmission on a single PUCCH may be configured and/or supported.

Thus, in one method, multiple UCI may be multiplexed and reported on a single PUCCH channel. If a PUCCH for HARQ-ACK partially or fully overlaps with one or more PUCCHs for SR, simultaneous HARQ-ACK and SR can be reported on a single PUCCH resource for HARQ-ACK. If a PUCCH for HARQ-ACK partially or fully overlaps with a PUCCH for CSI report, and if simultaneous HARQ-ACK and CSI is configured, HARQ-ACK and CSI multiplexing can be considered. Thus, the UE should choose the appropriate HARQ-ACK PUCCH resource based on the combined payload size and maximum coding rate of the PUCCH resource to determine if multiplexing of HARQ-ACK with CSI can be supported by the PUCCH resource, and which part of the CSI should be multiplexed and reported together. If multiplexing is feasible, perform joint coding of HARQ-ACK and all or part of the CSI. If multiplexing is not feasible, e.g. the coding rate is too high, the payload beyond the maximum supported value for PUCCH, the method for no simultaneous HARQ-ACK and CSI should be used.

In another method, only one PUCCH channel is transmitted at any given time, thus some channel dropping rule can be applied to determine which channel is transmitted and which channel is dropped.

Considering different types of UCI may have different priority and delay tolerance, a common framework may be designed for any collision cases (i.e., for both partial overlap and fully overlap cases), as described herein.

If simultaneous HARQ-ACK and CSI is not configured, multiplexing CSI and HARQ-ACK on a single PUCCH resource may not be supported. In this case, some priority rule may be defined to determine which PUCCH should be transmitted.

In one method, the channel priority may be based on the UCI type on each PUCCH. The priority listed from high to low may be HARQ-ACK>=SR>CSI. A single CSI report should be transmitted even if multiple CSI reports are triggered with priority high to low as aperiodic CSI>semi-persistent CSI>periodic CSI. For UCI with the same priority, if traffic type is considered, a UCI for URLLC service should have higher priority than a UCI for eMBB service.

In another method, the PUCCH priority may be based on the starting symbol of each PUCCH. The PUCCH that starts transmission earlier has higher priority. In case of same starting symbol, the UCI priority can be further applied to determine the channel priority.

In yet another method, the PUCCH priority can be determined based on the duration of each PUCCH. A PUCCH with shorter duration has higher priority. In the case of the same duration, the UCI priority and/or the starting position can be further applied to determine the channel priority.

Figure 5:
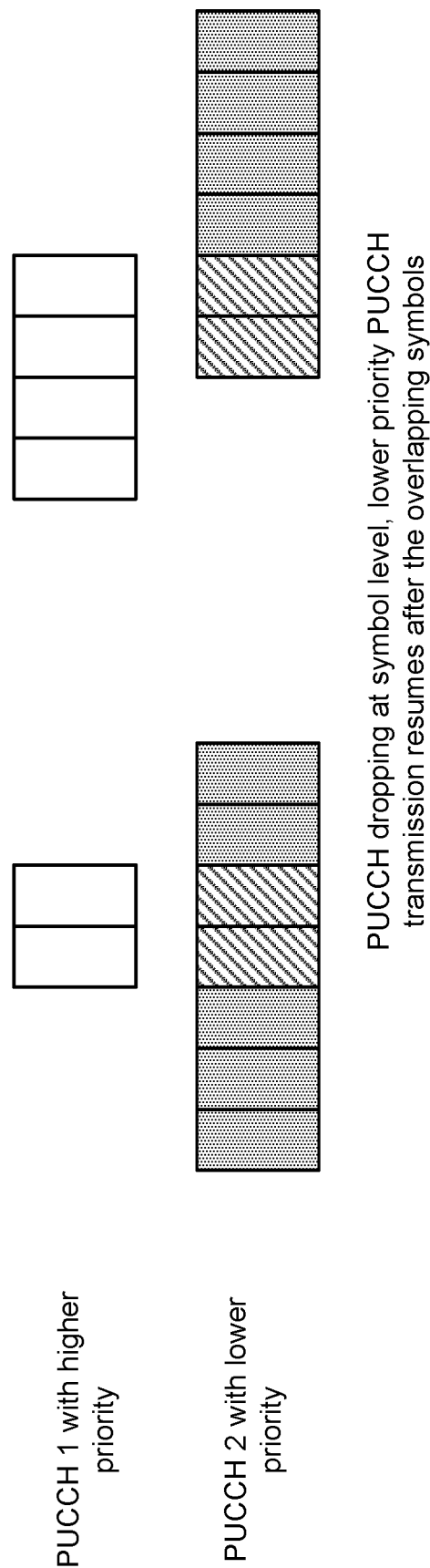
FIG. 5 is an example illustrating an approach for PUCCH dropping based on priority rules.
Figure 6:
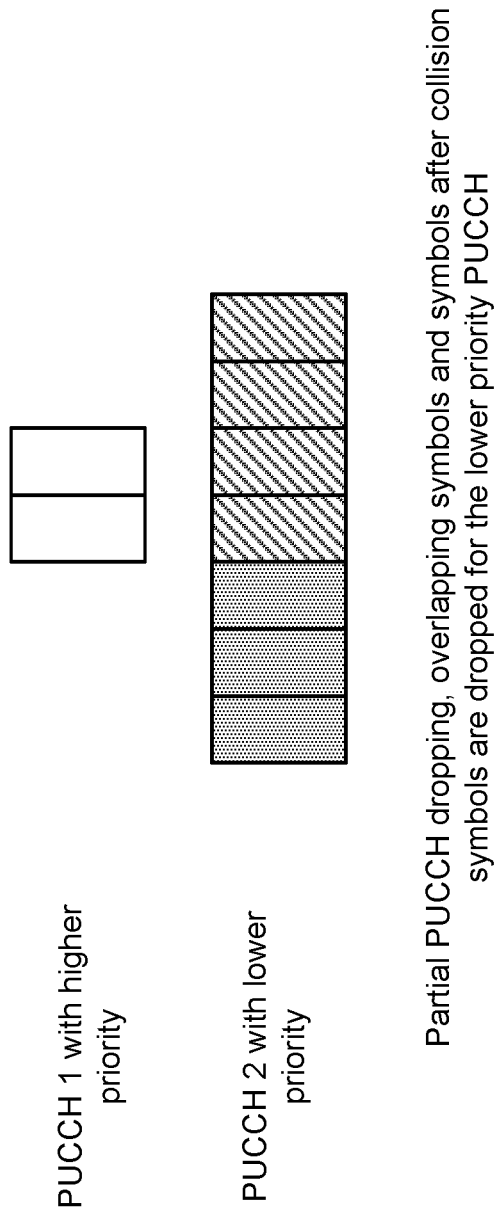
FIG. 6 is an example illustrating another approach for PUCCH dropping based on priority rules.
Figure 7:
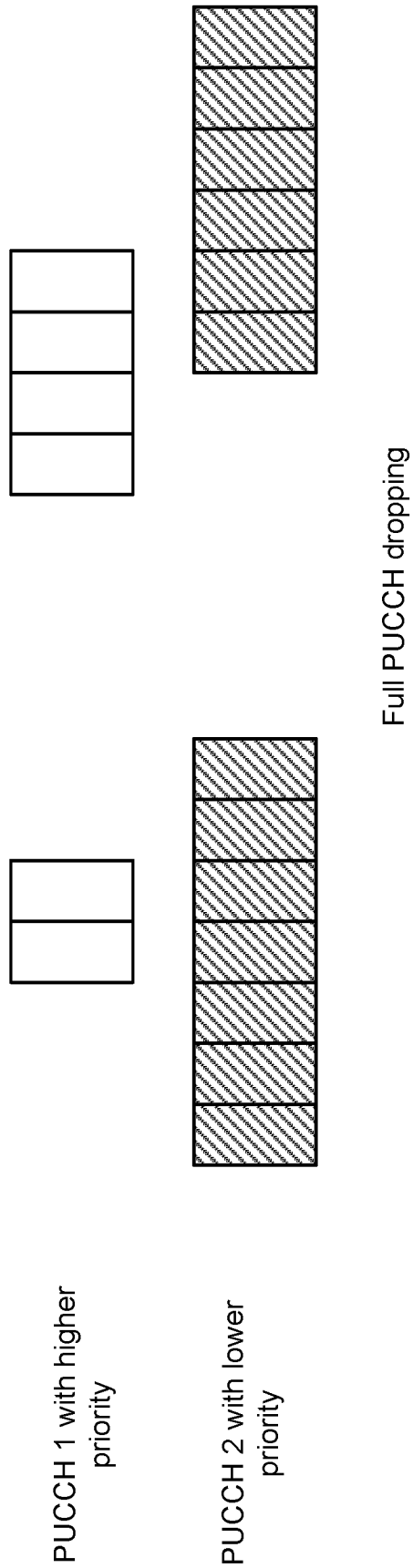
FIG. 7 is an example illustrating yet another approach for PUCCH dropping based on priority rules.

Based on the priority rules, the PUCCH dropping can be performed with different approaches, as shown in FIGS. 5-7. Without loss of generality, it is assumed that PUCCH 1 has higher priority than PUCCH 2 in FIGS. 5-7.

In one approach, the PUCCH dropping may be performed at symbol level, as shown in FIG. 5. Thus, the overlapping symbols on the PUCCH with lower priority are dropped. If there are any remaining symbols after the overlapping symbols, the transmission of PUCCH with lower priority can resume.

As an alternative in FIG. 6, the overlapping symbols on the PUCCH with lower priority are dropped. If there are any remaining symbols after the overlapping symbols, the transmission of PUCCH with lower priority are also dropped.

In both cases, the PUCCH with lower priority is punctured, and results in partial PUCCH transmission. The performance of the PUCCH with lower priority may be degraded. Sometime the PUCCH may not be decodable (e.g., if a DMRS symbol is punctured by symbol dropping).

Therefore, yet in another approach, full channel dropping may be used, as illustrated in FIG. 7. In the case of collision between two PUCCH, the PUCCH with lower priority is not transmitted. This assumes the UE 102 would know the collision situation in advance before the transmission of the other PUCCH. Full PUCCH channel dropping is easier to implement if there is enough processing time before the PUCCH transmissions. However, the UCI carried on the dropped PUCCH cannot be reported.

In a third aspect, PUCCH collision handling for long PUCCH with multi-slot transmissions is described herein. The PUCCH collision cases discussed above are mainly applicable for PUCCH reporting in a single slot. Namely, the PUCCH priority and channel dropping rules discussed above may be applied for the cases where multi-slot transmission (e.g., the nrofSlots parameter) is not configured for long PUCCH. As described above, for a multi-slot long PUCCH transmission, the PUCCH format resource (i.e., RB location, number of symbols, etc.) is determined by the initial PUCCH transmission. In each consecutive PUCCH transmission, the same PUCCH location within a slot is used. The PUCCH transmission repeats until the configured number of slots is reached.

Figure 8:
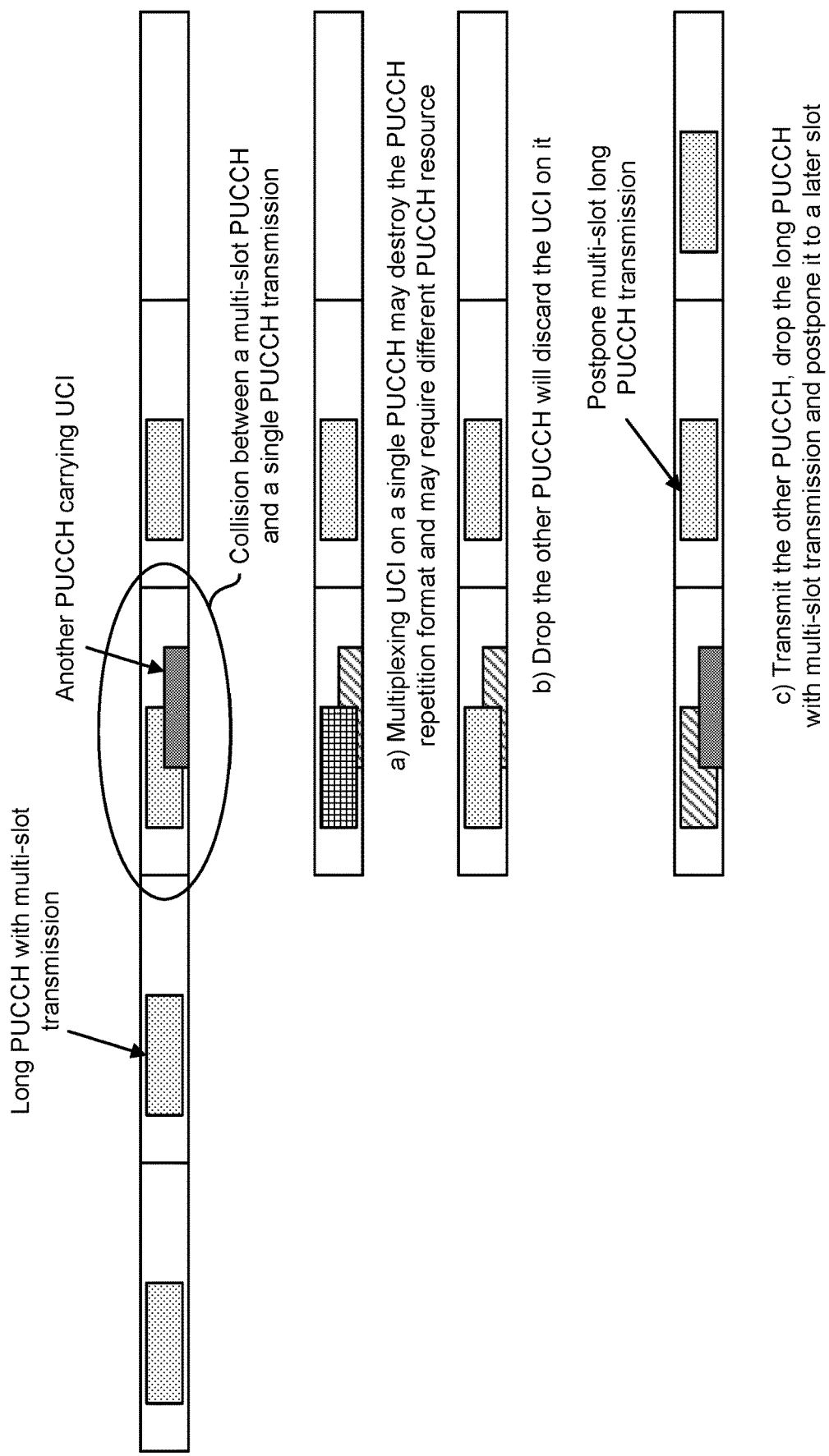
FIG. 8 is an example of collision handling between multi-slot PUCCH and single slot PUCCH.

However, for several reasons, the above mentioned methods may not be possible for a PUCCH collision between a long PUCCH transmission with multi-slot configuration and a single PUCCH instance in a given slot. FIG. 8 shows an example of collision handling between multi-slot PUCCH and single slot PUCCH.

If UCI multiplexing is used (as shown in approach (a) of FIG. 8), multiplexing multiple UCI on a multi-slot PUCCH will destroy the PUCCH repetition property. Soft combining would not be possible between multi-slot PUCCH transmissions. Furthermore, the format of the multi-slot PUCCH may be changed due to change of payload size. Since the PUCCH format/resource is determined by the initial long PUCCH transmission in a multi-slot PUCCH, there may not be PUCCH resources available for the aggregated payload sizes and multi-slot transmission.

On the other hand, if PUCCH dropping is applied, the other PUCCH will be dropped, and the UCI carried on the PUCCH will be discarded, as shown in approach (b) of FIG. 8. This may cause unnecessary performance loss.

The 'unknown' symbols in a semi-static DL/UL assignment can be used for long PUCCH transmission over multiple slots when a UE 102 receives a grant to transmit the long PUCCH. During the PUCCH repetition, i.e. during the consecutive PUCCH transmission, if there are not enough symbols for the long PUCCH location and duration in a slot, the long PUCCH is not transmitted in the given slot, the multi-slot transmission will be performed in later slots until the configured number of slots is reached. That is, for a multi-slot long PUCCH, PUCCH dropping and postponed transmission are already supported (e.g., due to insufficient resource or mismatch of slot format indicator (SFI) structure).

For long PUCCH with multi-slot transmission, similar behavior may be considered in the case of PUCCH channel collision with a single slot PUCCH by assuming some UL symbols are not available because they are occupied by the single slot PUCCH. Therefore, during a long PUCCH with multi-slot transmission, if the long PUCCH with multi-slot transmission overlaps with another single slot PUCCH, UCI multiplexing is not applied. Instead, the other single slot PUCCH is transmitted, and the long PUCCH with multi-slot transmission is dropped in the slot and the transmission is postponed to the next slot with available resources, as illustrated in approach (c) of FIG. 8. The single slot PUCCH may be a short PUCCH with format 0 or format 2; the single slot PUCCH may be a long PUCCH with format 1, 3 or 4.

The long PUCCH configured with multi-slot transmission is typically used to report HARQ-ACK although theoretically it can also be used to carry CSI. The collision between a long PUCCH with multi-slot transmission may occur in several cases. For example, a multi-slot PUCCH is postponed due to SFI mismatch in pervious slots to a slot with another PUCCH reporting; or a new UCI report is scheduled or triggered in a slot where the multi-slot PUCCH is scheduled for transmission in a multi-slot duration. The new UCI report may be HARQ-ACK for a recent PDSCH transmission, a triggered SR, a configured periodic CSI, a triggered A-CSI etc.

For example, in a given slot, in a case that long PUCCH (e.g., PUCCH format 1, 3, or 4) with multi-slot transmission conveying HARQ-ACK collides with a short PUCCH (e.g., PUCCH format 0, or 2) conveying HARQ-ACK, the short PUCCH carrying HARQ-ACK may be transmitted. And, the long PUCCH conveying HARQ-ACK with multi-slot transmission is dropped in the given slot, and is postponed for transmission in a next available slot. Namely, in a case that multi-slot transmission (e.g., the nrofSlots parameter) is configured for long PUCCH, for the given slot, short PUCCH may be prioritized over the long PUCCH configured with multi-slot transmission.

Also, for example, in a given slot, in a case that long PUCCH (e.g., PUCCH format 1, 3 or 4) with multi-slot transmission conveying HARQ-ACK collides with another single slot long PUCCH (e.g., PUCCH format 1, 3 or 4) conveying HARQ-ACK, the single slot long PUCCH (e.g., PUCCH format 3 or 4) carrying HARQ-ACK may be transmitted. And, the long PUCCH conveying HARQ-ACK with multi-slot transmission is dropped in the given slot, and is postponed for transmission in a next available slot. Namely, in a case that multi-slot transmission (e.g., the nrofSlots parameter) is configured for long PUCCH, for the given slot, a single slot long PUCCH (e.g., PUCCH format 1, 3 or 4) may be prioritized over a long PUCCH with multi-slot transmissions.

Yet in another example, in a given slot, in a case that long PUCCH (e.g., PUCCH format 1, 3 or 4) with multi-slot transmission conveying HARQ-ACK collides with a short PUCCH (e.g., PUCCH format 2) or a long PUCCH (e.g., PUCCH format 3 and 4) conveying CSI, the PUCCH carrying CSI may be transmitted. And, the long PUCCH conveying HARQ-ACK with multi-slot transmission is dropped in the given slot, and is postponed for transmission in a next available slot. Namely, in a case that multi-slot transmission (e.g., the nrofSlots parameter) is configured for long PUCCH (e.g., PUCCH format 1), for the given slot, a single slot PUCCH transmission for CSI may be prioritized over a long PUCCH with multi-slot transmission for HARQ-ACK.

Although the examples are for multi-slot long PUCCH carrying HARQ-ACK, the same principle applies if CSI is carried on a multi-slot long PUCCH with Format 3 or Format 4. Namely, a single slot PUCCH transmission for UCI (e.g. HARQ-ACK and/or SR and/or CSI) may be prioritized over a long PUCCH with multi-slot transmission.

Namely, in a case that multi-slot transmission (e.g., the nrofSlots parameter) is configured for long PUCCH format, the long PUCCH format configured with the multi-slot transmission has lower priority and may be dropped for the given slot. Other PUCCH format(s) (e.g., shot PUCCH and/or long PUCCH) may be prioritized over the long PUCCH format configured with the multi-slot transmission.

As a special case, if up to 2 bits of HARQ-ACK are carried on a long PUCCH format 1 with multi-slot transmission, and the PUCCH partial or fully overlaps with a positive SR transmission on another PUCCH resource, the HARQ-ACK PUCCH may be used to carry both HARQ-ACK and SR (e.g., the SR can be represented by a cyclic shift over the HARQ-ACK sequence).

In another approach, if the SR is also configured with PUCCH format 1, the HARQ-ACK may be reported on the PUCCH resource for SR, i.e. in case of negative SR, the HARQ-ACK is reported on the PUCCH format 1 resource for HARQ-ACK; in case of positive SR, the HARQ-ACK is reported using SR PUCCH 1 resource. Thus, the SR is indicated by on/off keying on PUCCH transmission on the SR resource. This method is fine if the SR PUCCH resource and HARQ-ACK PUCCH resource are fully overlapping, i.e. they have the same staring symbol and duration in a slot. However, in case of partial overlapping case, there are related timing issues, e.g. whether the HARQ-ACK can be reported earlier or postponed due to misalignment of PUCCH format 1 for HARQ-ACK and SR resources.

If a long PUCCH with multi-slot transmission collides with another long PUCCH with multi-slot transmission, the PUCCH priority and channel dropping rules discussed above can be used to determine which PUCCH is transmitted. The other PUCCH should be dropped in the given slot and be postponed for transmission in the coming slots with available long PUCCH resources.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH collision handling for multi-slot long PUCCH as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

FIG. 2 is an example illustrating combinations of PUCCH collisions between short PUCCH and short PUCCH. FIG. 2 includes fully overlap cases and partial overlap cases.

FIG. 3 is an example illustrating combinations of PUCCH collisions between short PUCCH and long PUCCH. FIG. 3 includes fully overlap cases and partial overlap cases.

FIG. 4 is an example illustrating combinations of PUCCH collisions between long PUCCH and long PUCCH. FIG. 4 includes fully overlap cases and partial overlap cases.

FIG. 5 is an example illustrating an approach for PUCCH dropping based on priority rules. In this approach, PUCCH dropping may be at symbol level. Lower priority PUCCH transmission resumes after the overlapping symbols.

FIG. 6 is an example illustrating another approach for PUCCH dropping based on priority rules. In this approach, partial PUCCH dropping may occur. Overlapping symbols and symbols after collision symbols may be dropped for the lower priority PUCCH.

FIG. 7 is an example illustrating yet another approach for PUCCH dropping based on priority rules. In this approach, full PUCCH dropping may occur.

FIG. 8 is an example of collision handling between multi-slot PUCCH and single slot PUCCH. A collision between a multi-slot PUCCH and a single PUCCH transmission may occur. In a first approach (a), multiplexing UCI on a single PUCCH may destroy the PUCCH repetition format and may require different PUCCH resources.

In a second approach (b), the other PUCCH will be dropped, and the UCI carried on the PUCCH will be discarded.

In a third approach (c), the other PUCCH may be transmitted. The long PUCCH with multi-slot transmission may be dropped and postponed to a later slot.

Figure 9:
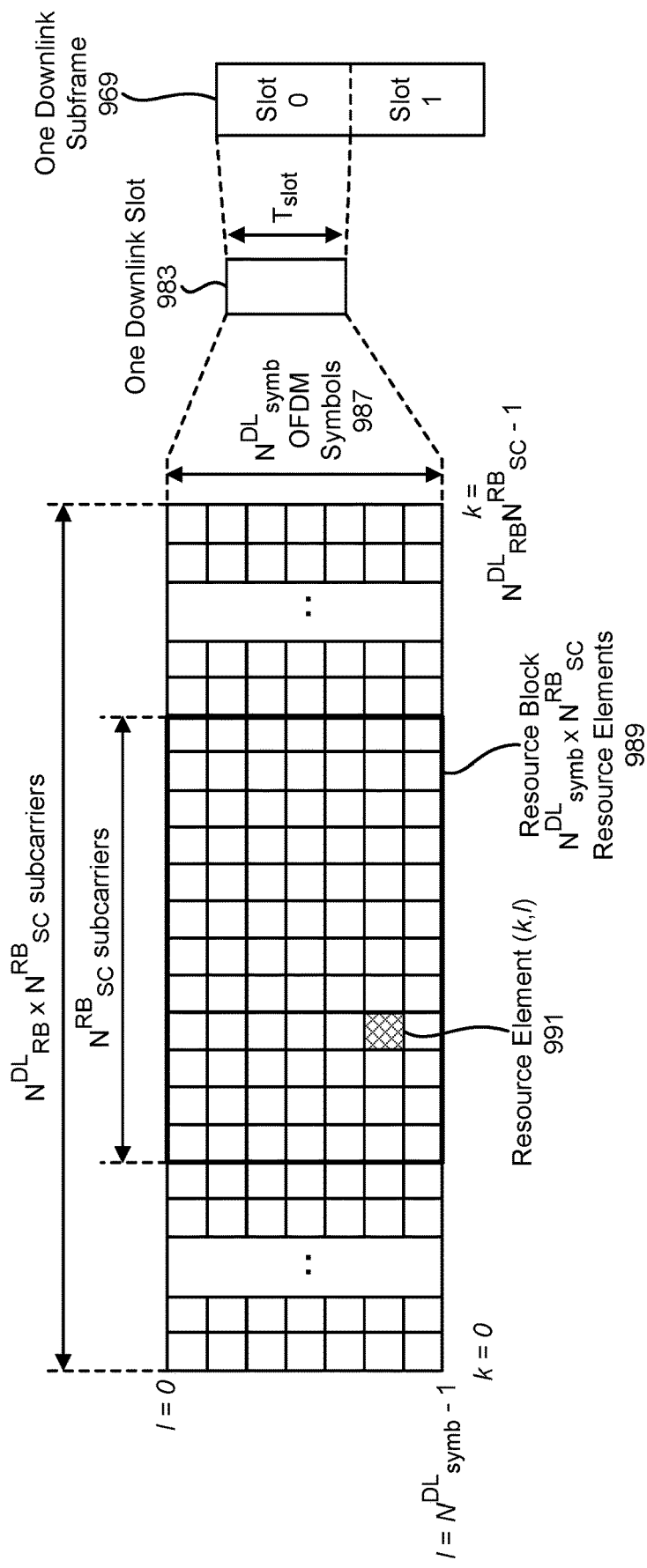
FIG. 9 is a diagram illustrating an example of a resource grid for the downlink.

FIG. 9 is a diagram illustrating one example of a resource grid for the downlink. The resource grid illustrated in FIG. 9 may be utilized in some implementations of the systems and methods disclosed herein. More detail regarding the resource grid is given in connection with FIG. 1.

In FIG. 9, one downlink subframe 969 may include two downlink slots 983. $N^{DL}_{RB}$ is downlink bandwidth configuration of the serving cell, expressed in multiples of $N^{RB}_{sc}$, where $N^{RB}_{sc}$ is a resource block 989 size in the frequency domain expressed as a number of subcarriers, and $N^{DL}_{symb}$ is the number of OFDM symbols 987 in a downlink slot 983. A resource block 989 may include a number of resource elements (RE) 991.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 991 may be the RE 991 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 10:
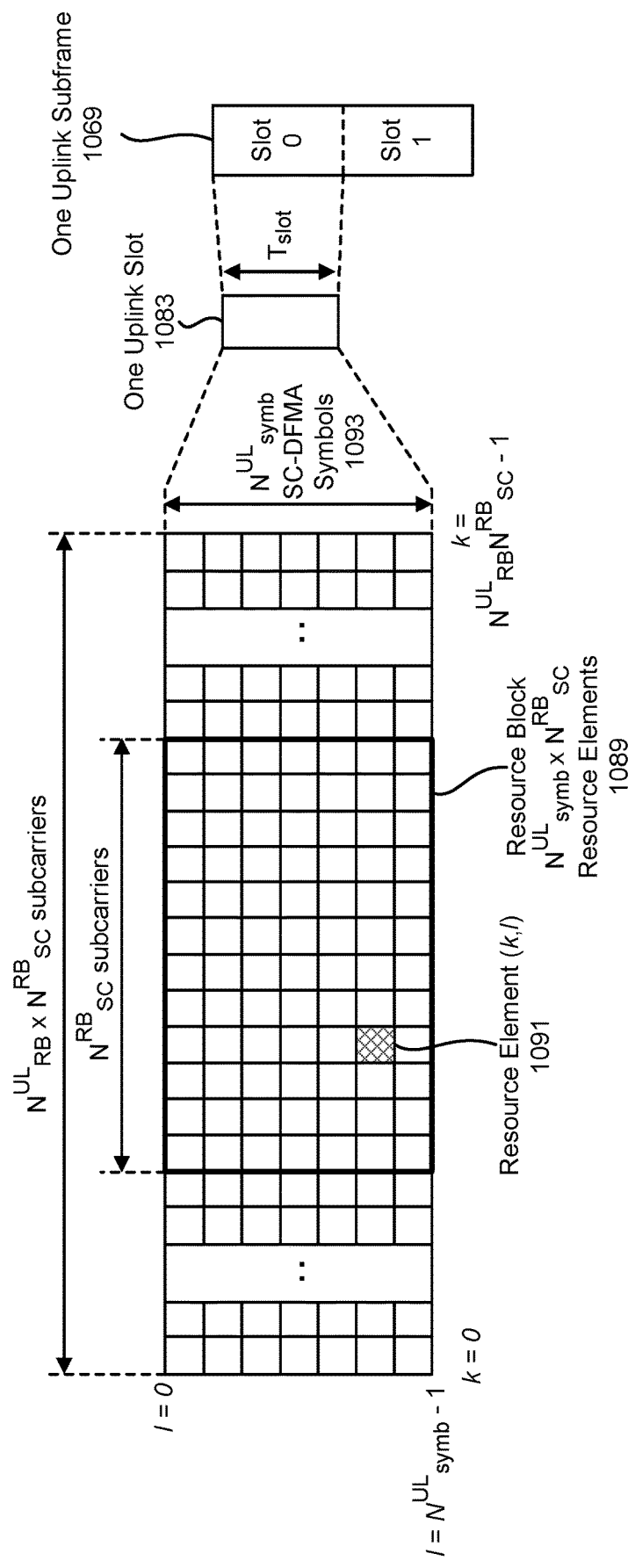
FIG. 10 is a diagram illustrating one example of a resource grid for the uplink.

FIG. 10 is a diagram illustrating one example of a resource grid for the uplink. The resource grid illustrated in FIG. 10 may be utilized in some implementations of the systems and methods disclosed herein. More detail regarding the resource grid is given in connection with FIG. 1.

In FIG. 10, one uplink subframe 1069 may include two uplink slots 1083. $N^{UL}_{RB}$ is uplink bandwidth configuration of the serving cell, expressed in multiples of $N^{RB}_{sc}$, where $N^{RB}_{sc}$ is a resource block 1089 size in the frequency domain expressed as a number of subcarriers, and $N^{UL}_{symb}$ is the number of SC-FDMA symbols 1093 in an uplink slot 1083. A resource block 1089 may include a number of resource elements (RE) 1091.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 11:
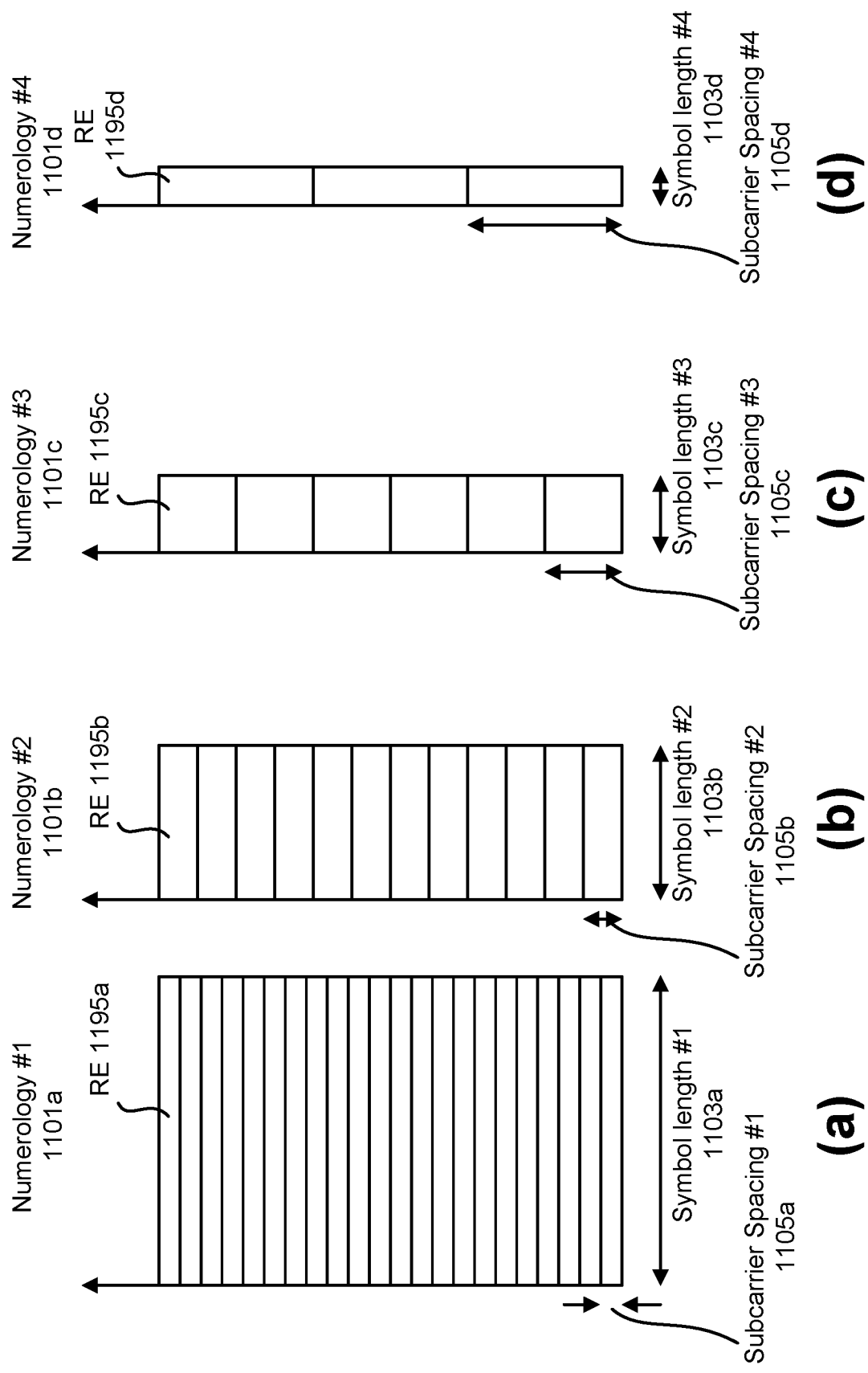
FIG. 11 shows examples of several numerologies.

FIG. 11 shows examples of several numerologies 1101. The numerology #1 1101a may be a basic numerology (e.g., a reference numerology). For example, a RE 1195a of the basic numerology 1101a may be defined with subcarrier spacing 1105a of 15 kHz in frequency domain and 2048 Ts+CP length (e.g., 160 Ts or 144 Ts) in time domain (i.e., symbol length #1 1103a), where Ts denotes a baseband sampling time unit defined as 1/(15000*2048) seconds. For the i-th numerology, the subcarrier spacing 1105 may be equal to $15*2^i$ and the effective OFDM symbol length $2048*2^{-i}$Ts. It may cause the symbol length is $2048*2^{-i}$Ts+CP length (e.g., $160*2^{-i}$Ts or $144*2^{-i}$Ts). In other words, the subcarrier spacing of the i+1-th numerology is a double of the one for the i-th numerology, and the symbol length of the i+1-th numerology is a half of the one for the i-th numerology. FIG. 11 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 12:
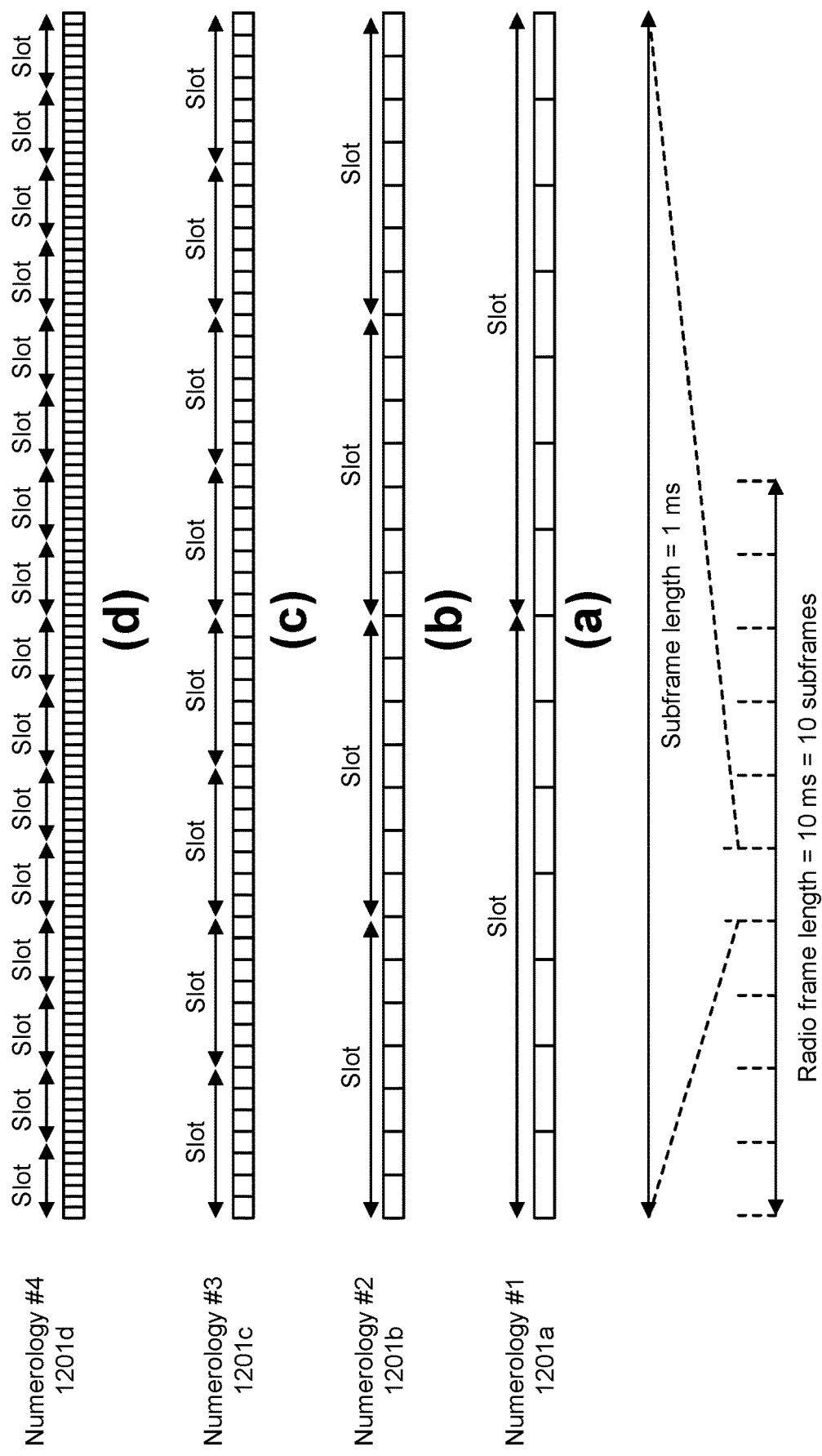
FIG. 12 shows examples of subframe structures for the numerologies that are shown in FIG. 11.

FIG. 12 shows examples of subframe structures for the numerologies 1201 that are shown in FIG. 11. Given that a slot 1283 includes $N^{DL}_{symb}$ (or $N^{UL}_{symb}$)=7 symbols, the slot length of the i+1-th numerology 1201 is a half of the one for the i-th numerology 1201, and eventually the number of slots 1283 in a subframe (i.e., 1 ms) becomes double. It may be noted that a radio frame may include 10 subframes, and the radio frame length may be equal to 10 ms.

Figure 13:
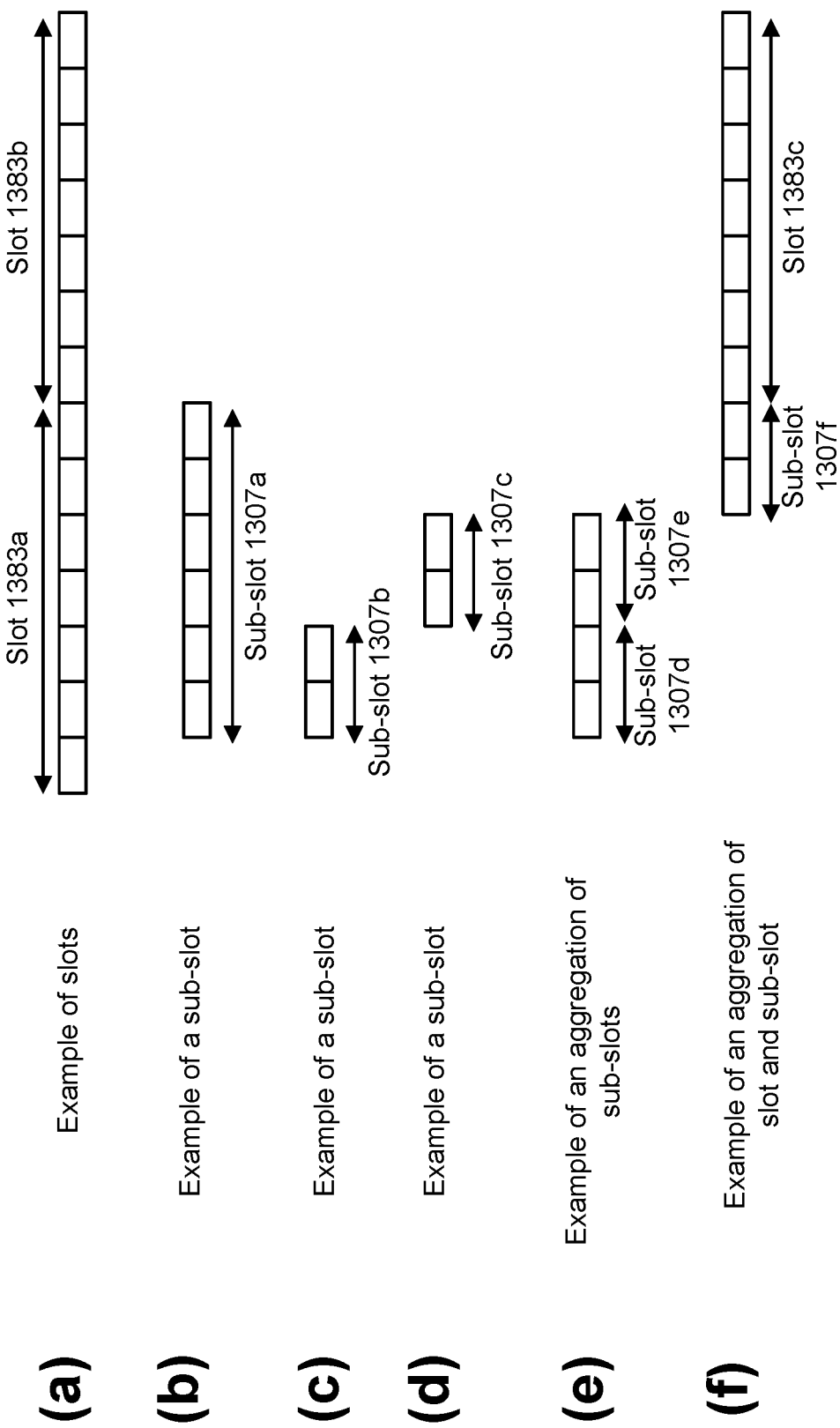
FIG. 13 shows examples of slots and sub-slots.

FIG. 13 shows examples of slots 1383 and sub-slots 1307. If a sub-slot 1307 is not configured by higher layer, the UE 102 and the eNB/gNB 160 may only use a slot 1383 as a scheduling unit. More specifically, a given transport block may be allocated to a slot 1383. If the sub-slot 1307 is configured by higher layer, the UE 102 and the eNB/gNB 160 may use the sub-slot 1307 as well as the slot 1383. The sub-slot 1307 may include one or more OFDM symbols. The maximum number of OFDM symbols that constitute the sub-slot 1307 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1307 may start at any symbol within a slot 1383 unless it collides with a control channel. There could be restrictions of mini-slot length based on restrictions on starting position. For example, the sub-slot 1307 with the length of $N^{UL}_{symb}-1$ (or $N^{UL}_{symb}-1$) may start at the second symbol in a slot 1383. The starting position of a sub-slot 1307 may be indicated by a physical layer control channel (e.g., by DCI format). Alternatively, the starting position of a sub-slot 1307 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1307.

In cases when the sub-slot 1307 is configured, a given transport block may be allocated to either a slot 1383, a sub-slot 1307, aggregated sub-slots 1307 or aggregated sub-slot(s) 1307 and slot 1383. This unit may also be a unit for HARQ-ACK bit generation.

Figure 14:
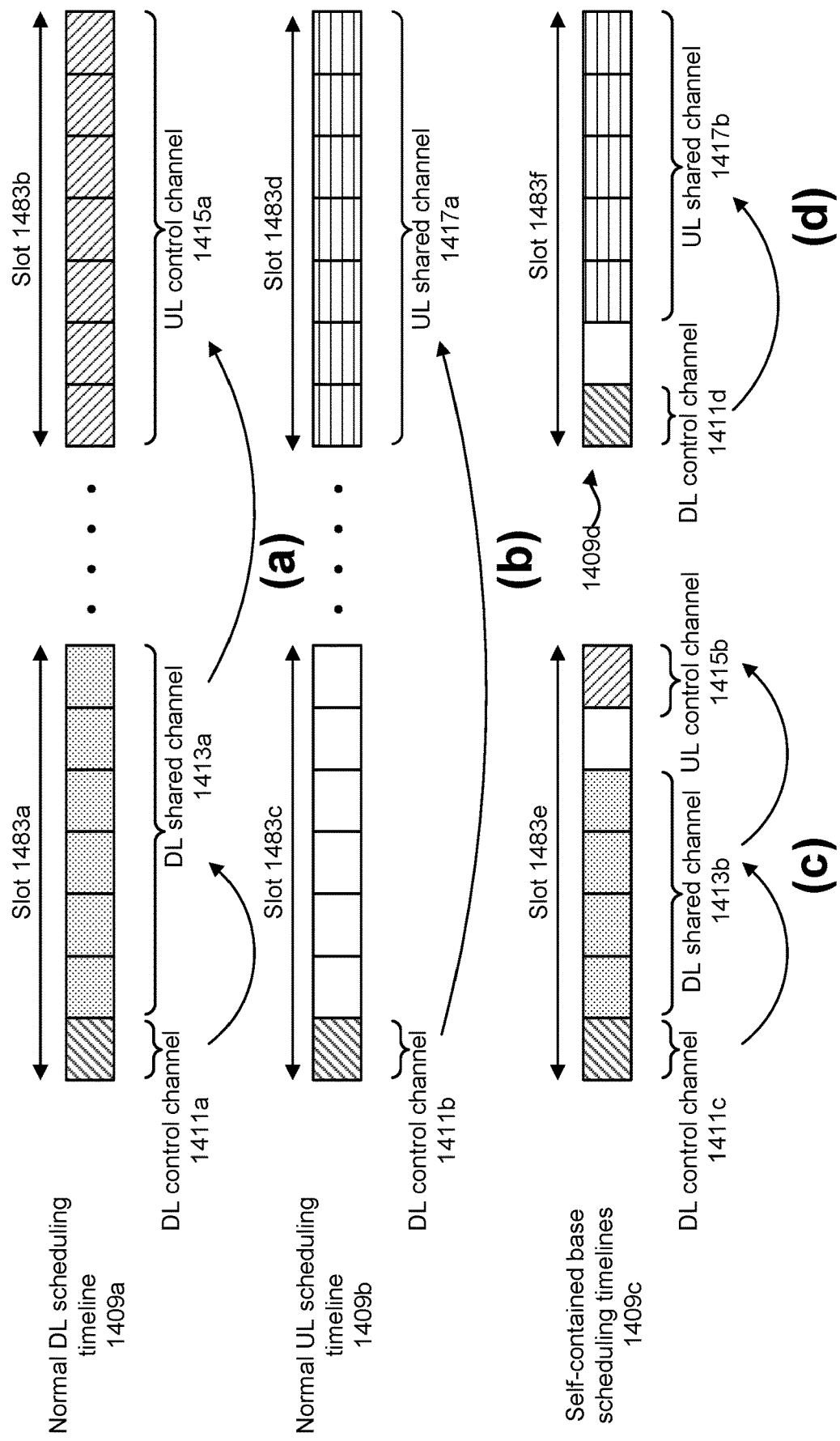
FIG. 14 shows examples of scheduling timelines.

FIG. 14 shows examples of scheduling timelines 1409. For a normal DL scheduling timeline 1409a, DL control channels are mapped the initial part of a slot 1483a. The DL control channels 1411 schedule DL shared channels 1413a in the same slot 1483a. HARQ-ACKs for the DL shared channels 1413a (i.e., HARQ-ACKs each of which indicates whether or not transport block in each DL shared channel 1413a is detected successfully) are reported via UL control channels 1415a in a later slot 1483b. In this instance, a given slot 1483 may contain either one of DL transmission and UL transmission.

For a normal UL scheduling timeline 1409b, DL control channels 1411b are mapped the initial part of a slot 1483c. The DL control channels 1411b schedule UL shared channels 1417a in a later slot 1483d. For these cases, the association timing (time shift) between the DL slot 1483c and the UL slot 1483d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1409*c*, DL control channels 1411*c* are mapped to the initial part of a slot 1483*e*. The DL control channels 1411*c* schedule DL shared channels 1413*b* in the same slot 1483*e*. HARQ-ACKs for the DL shared channels 1413*b* are reported in UL control channels 1415*b*, which are mapped at the ending part of the slot 1483*e*.

For a self-contained base UL scheduling timeline 1409*d*, DL control channels 1411*d* are mapped to the initial part of a slot 1483*f*. The DL control channels 1411*d* schedule UL shared channels 1417*b* in the same slot 1483*f*. For these cases, the slot 1483*f* may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 15:
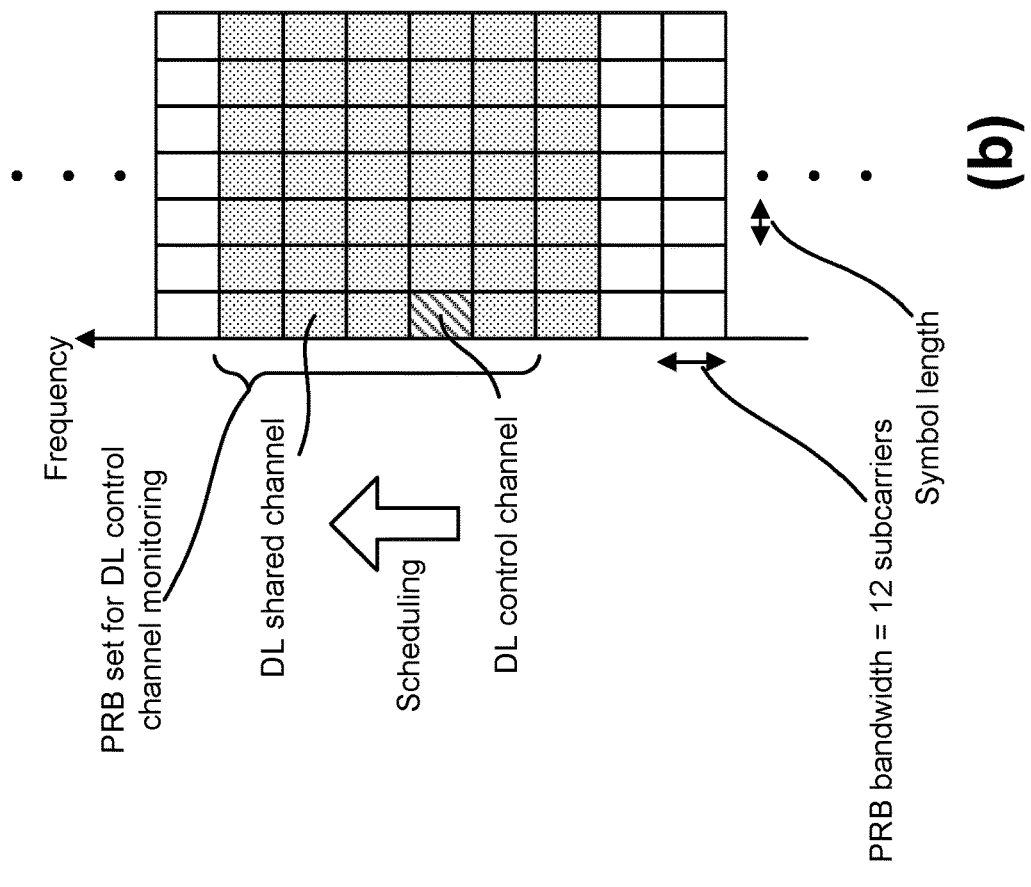
FIG. 15 shows examples of DL control channel monitoring regions.
Figure 15:
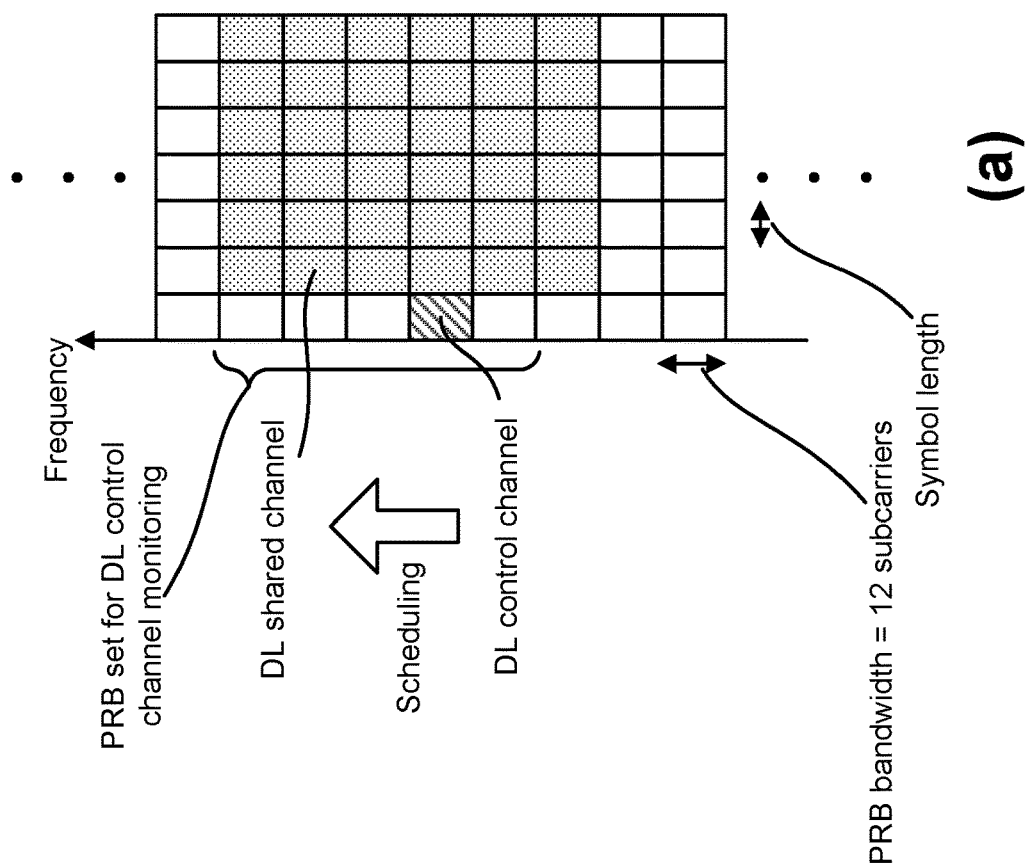

FIG. 15 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 16:
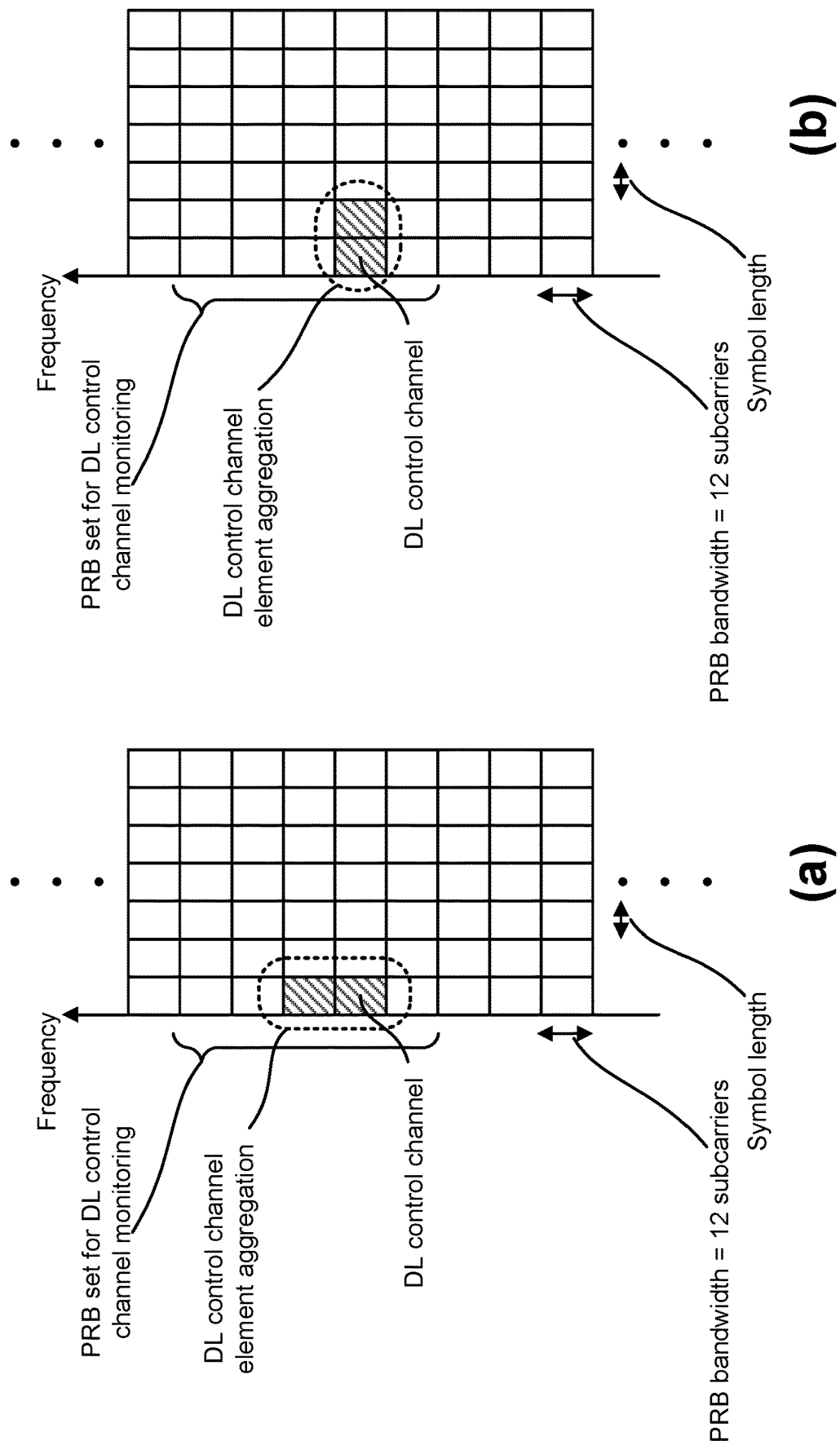
FIG. 16 shows examples of DL control channel which includes more than one control channel elements.

FIG. 16 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 17:
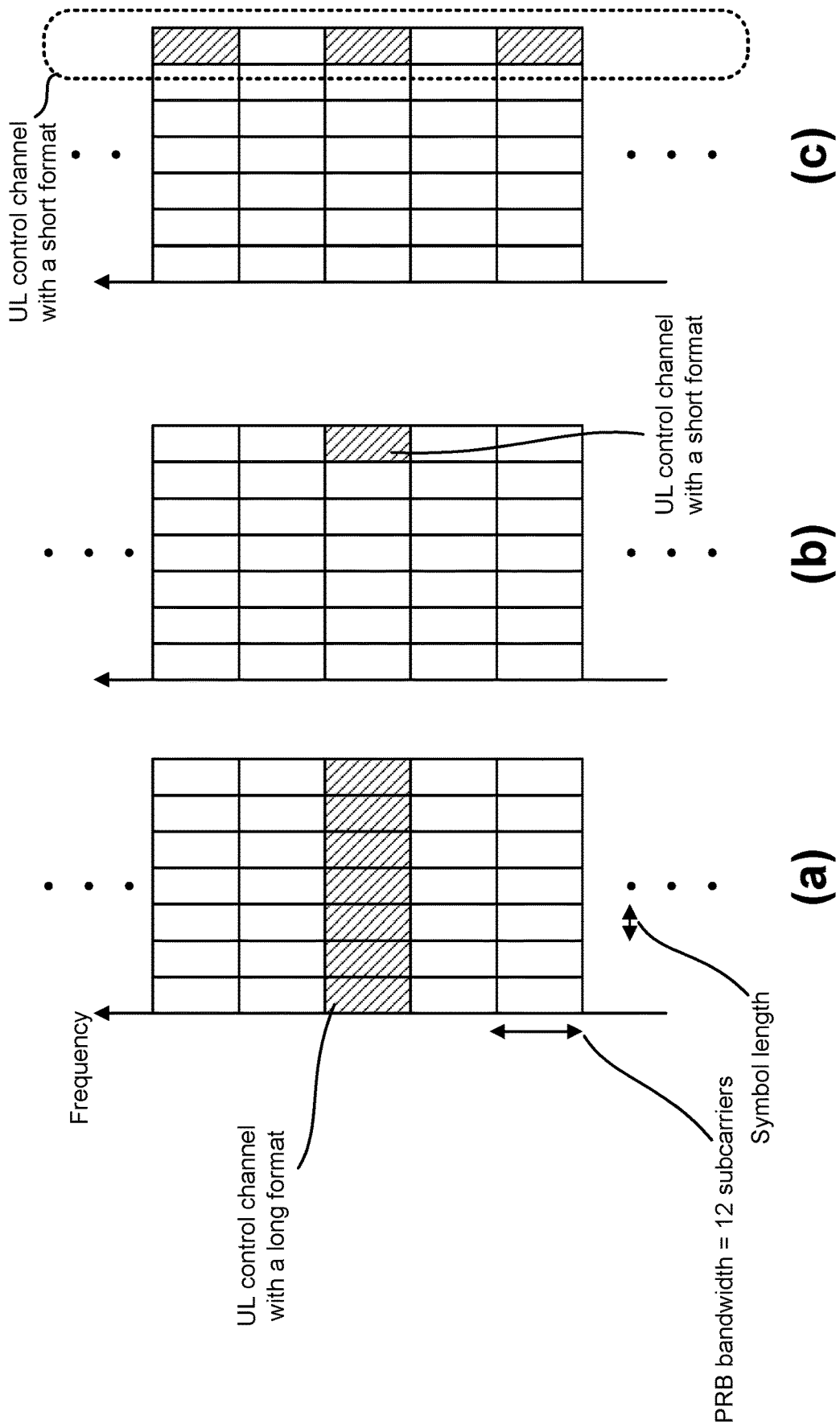
FIG. 17 shows examples of UL control channel structures.

FIG. 17 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 18:
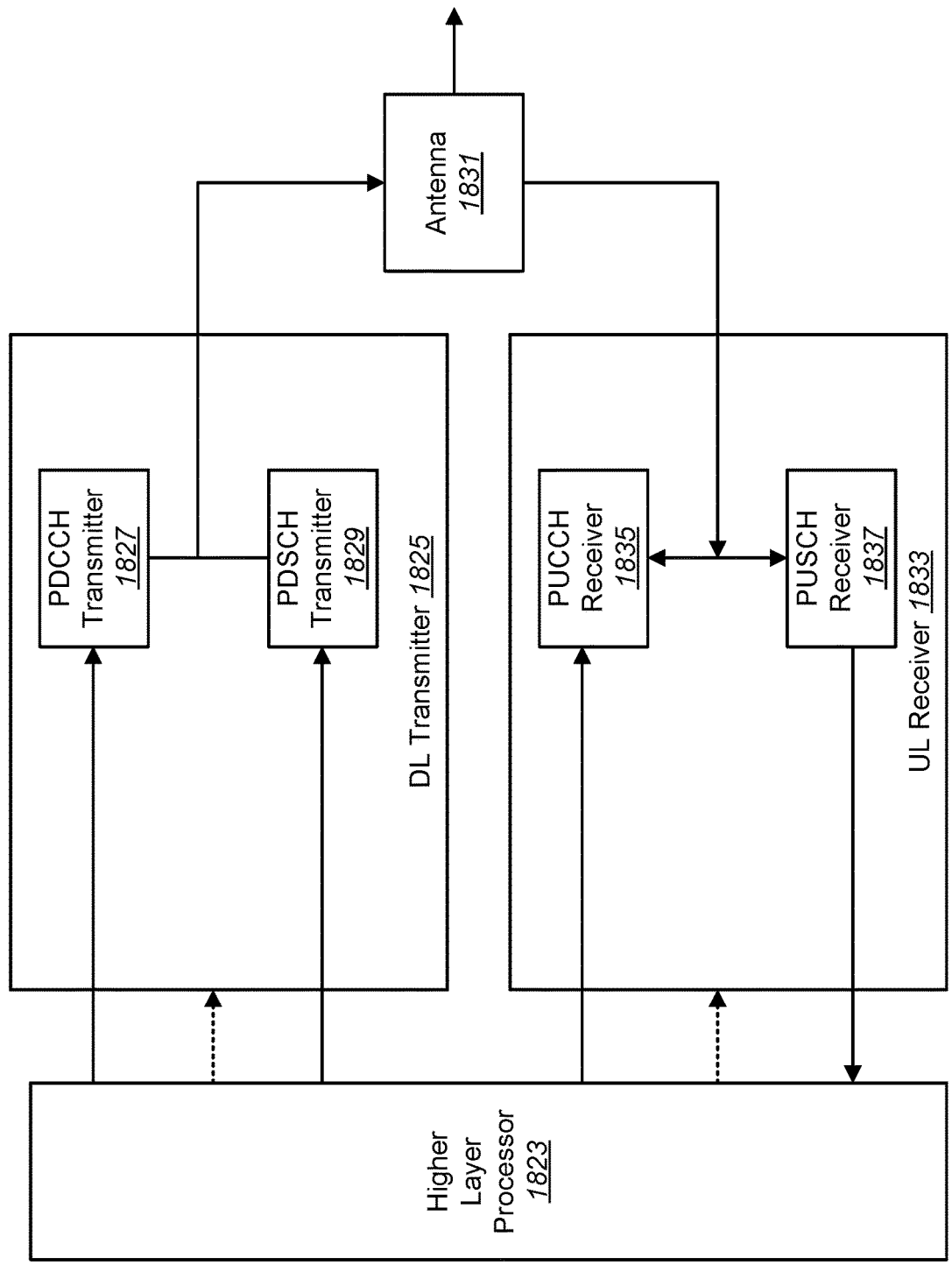
FIG. 18 is a block diagram illustrating one implementation of a gNB.

FIG. 18 is a block diagram illustrating one implementation of a gNB 1860. The gNB 1860 may include a higher layer processor 1823, a DL transmitter 1825, a UL receiver 1833, and one or more antenna 1831. The DL transmitter 1825 may include a PDCCH transmitter 1827 and a PDSCH transmitter 1829. The UL receiver 1833 may include a PUCCH receiver 1835 and a PUSCH receiver 1837.

The higher layer processor 1823 may manage physical layer's behaviors (the DL transmitter's and the UL receiver's behaviors) and provide higher layer parameters to the physical layer. The higher layer processor 1823 may obtain transport blocks from the physical layer. The higher layer processor 1823 may send/acquire higher layer messages such as an RRC message and MAC message to/from a UE's higher layer. The higher layer processor 1823 may provide the PDSCH transmitter transport blocks and provide the PDCCH transmitter transmission parameters related to the transport blocks.

The DL transmitter 1825 may multiplex downlink physical channels and downlink physical signals (including reservation signal) and transmit them via transmission antennas 1831. The UL receiver 1833 may receive multiplexed uplink physical channels and uplink physical signals via receiving antennas 1831 and de-multiplex them. The PUCCH receiver 1835 may provide the higher layer processor 1823 UCI. The PUSCH receiver 1837 may provide the higher layer processor 1823 received transport blocks.

Figure 19:
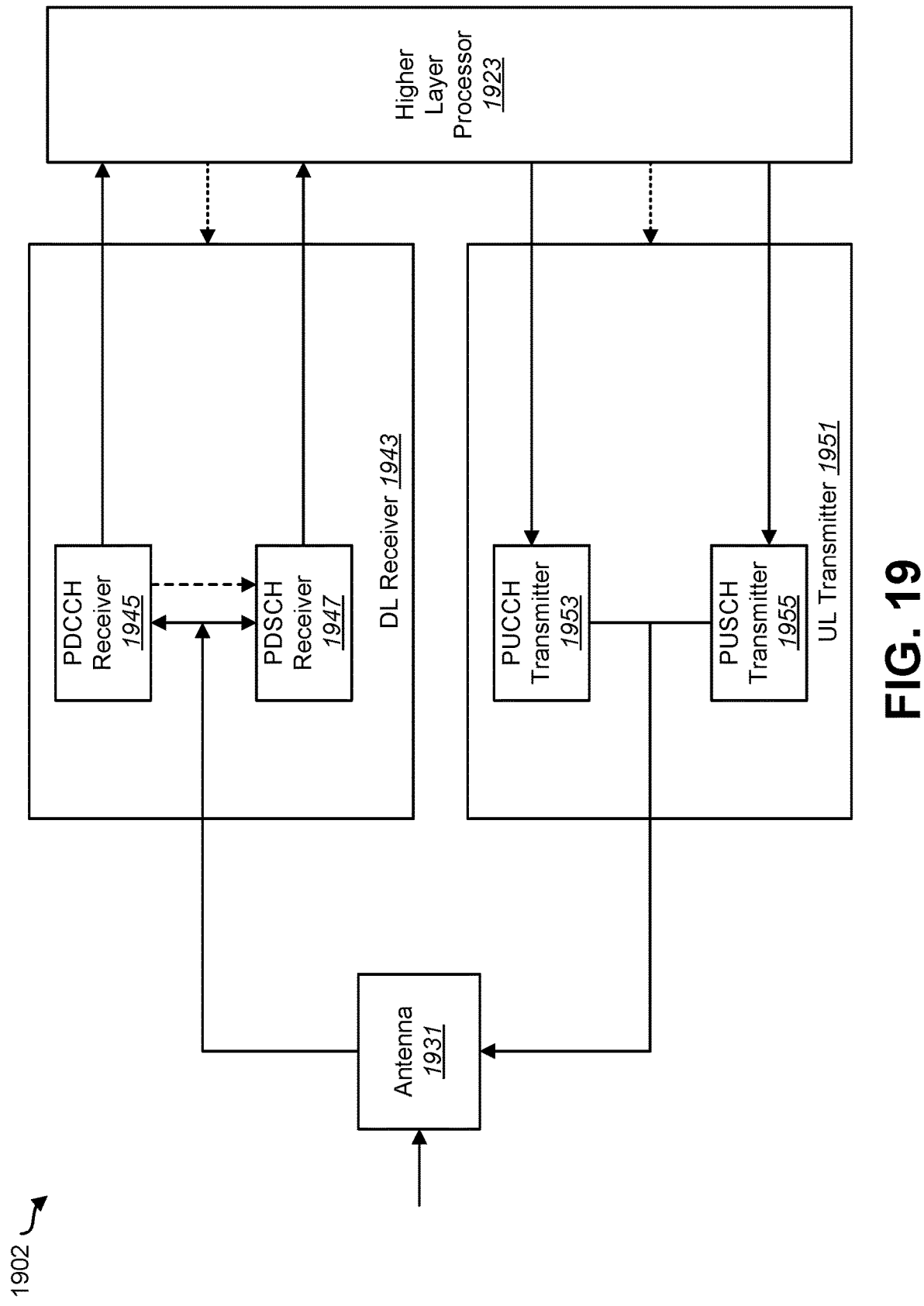
FIG. 19 is a block diagram illustrating one implementation of a UE.

FIG. 19 is a block diagram illustrating one implementation of a UE 1902. The UE 1902 may include a higher layer processor 1923, a UL transmitter 1951, a DL receiver 1943, and one or more antenna 1931. The UL transmitter 1951 may include a PUCCH transmitter 1953 and a PUSCH transmitter 1955. The DL receiver 1943 may include a PDCCH receiver 1945 and a PDSCH receiver 1947.

The higher layer processor 1923 may manage physical layer's behaviors (the UL transmitter's and the DL receiver's behaviors) and provide higher layer parameters to the physical layer. The higher layer processor 1923 may obtain transport blocks from the physical layer. The higher layer processor 1923 may send/acquire higher layer messages such as an RRC message and MAC message to/from a UE's higher layer. The higher layer processor 1923 may provide the PUSCH transmitter transport blocks and provide the PUCCH transmitter 1953 UCI.

The DL receiver 1943 may receive multiplexed downlink physical channels and downlink physical signals via receiving antennas 1931 and de-multiplex them. The PDCCH receiver 1945 may provide the higher layer processor 1923 DCI. The PDSCH receiver 1947 may provide the higher layer processor 1923 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 20:
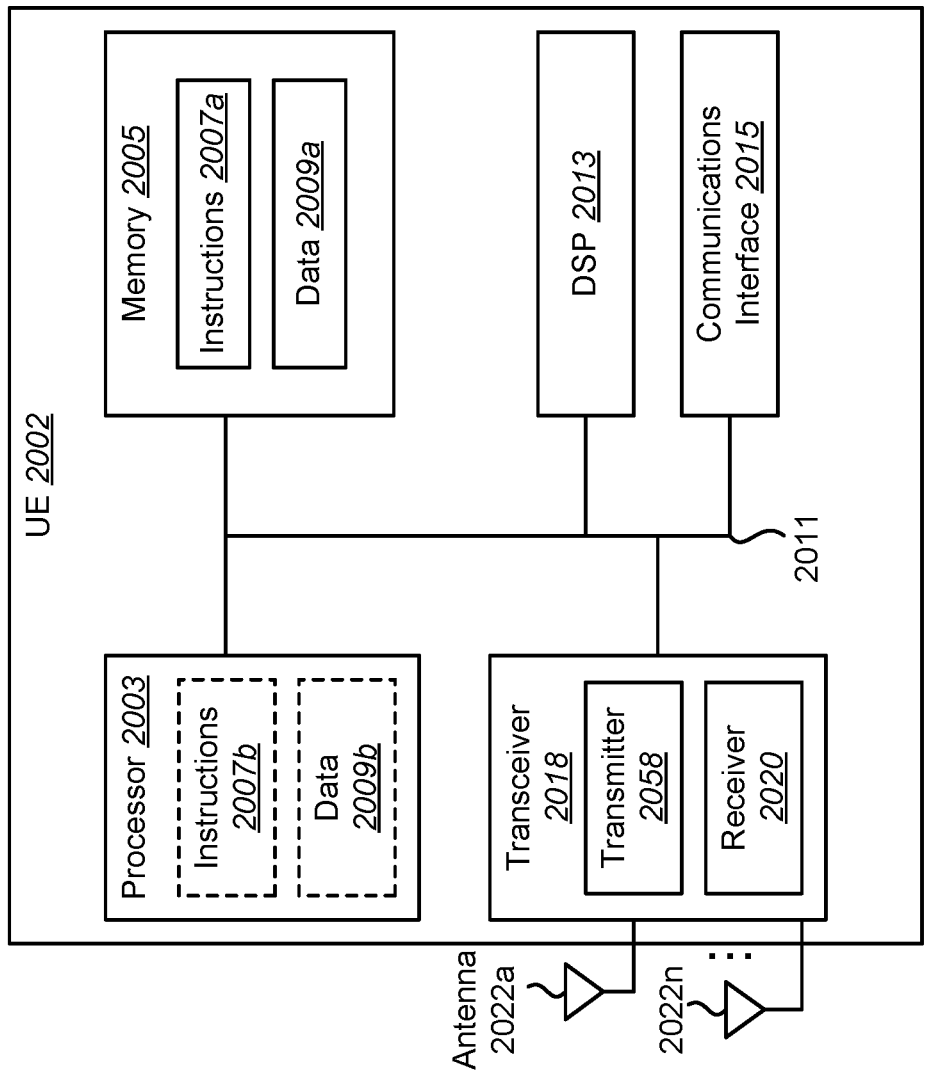
FIG. 20 illustrates various components that may be utilized in a UE.

FIG. 20 illustrates various components that may be utilized in a UE 2002. The UE 2002 described in connection with FIG. 20 may be implemented in accordance with the UE 102 described in connection with FIG. 1. The UE 2002 includes a processor 2003 that controls operation of the UE 2002. The processor 2003 may also be referred to as a central processing unit (CPU). Memory 2005, which may include read-only memory (ROM), random access memory (RAM), a combination of the two or any type of device that may store information, provides instructions 2007a and data 2009a to the processor 2003. A portion of the memory 2005 may also include non-volatile random-access memory (NVRAM). Instructions 2007b and data 2009b may also reside in the processor 2003. Instructions 2007b and/or data 2009b loaded into the processor 2003 may also include instructions 2007a and/or data 2009a from memory 2005 that were loaded for execution or processing by the processor 2003. The instructions 2007b may be executed by the processor 2003 to implement the methods described above.

The UE 2002 may also include a housing that contains one or more transmitters 2058 and one or more receivers 2020 to allow transmission and reception of data. The transmitter(s) 2058 and receiver(s) 2020 may be combined into one or more transceivers 2018. One or more antennas 2022a-n are attached to the housing and electrically coupled to the transceiver 2018.

The various components of the UE 2002 are coupled together by a bus system 2011, which may include a power bus, a control signal bus and a status signal bus, in addition to a data bus. However, for the sake of clarity, the various buses are illustrated in FIG. 20 as the bus system 2011. The UE 2002 may also include a digital signal processor (DSP) 2013 for use in processing signals. The UE 2002 may also include a communications interface 2015 that provides user access to the functions of the UE 2002. The UE 2002 illustrated in FIG. 20 is a functional block diagram rather than a listing of specific components.

Figure 21:
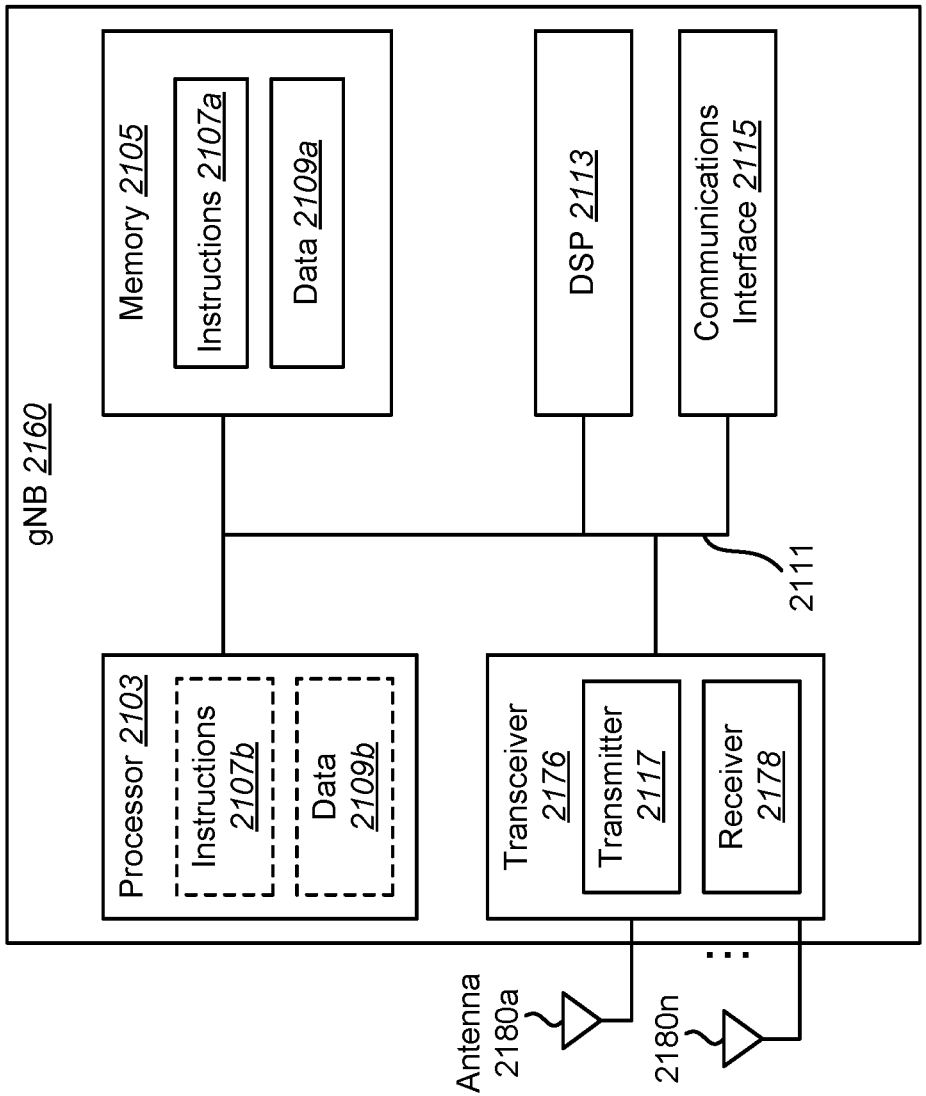
FIG. 21 illustrates various components that may be utilized in a gNB.

FIG. 21 illustrates various components that may be utilized in a gNB 2160. The gNB 2160 described in connection with FIG. 21 may be implemented in accordance with the gNB 160 described in connection with FIG. 1. The gNB 2160 includes a processor 2103 that controls operation of the gNB 2160. The processor 2103 may also be referred to as a central processing unit (CPU). Memory 2105, which may include read-only memory (ROM), random access memory (RAM), a combination of the two or any type of device that may store information, provides instructions 2107a and data 2109a to the processor 2103. A portion of the memory 2105 may also include non-volatile random-access memory (NVRAM). Instructions 2107b and data 2109b may also reside in the processor 2103. Instructions 2107b and/or data 2109b loaded into the processor 2103 may also include instructions 2107a and/or data 2109a from memory 2105 that were loaded for execution or processing by the processor 2103. The instructions 2107b may be executed by the processor 2103 to implement the methods described above.

The gNB 2160 may also include a housing that contains one or more transmitters 2117 and one or more receivers 2178 to allow transmission and reception of data. The transmitter(s) 2117 and receiver(s) 2178 may be combined into one or more transceivers 2176. One or more antennas 2180a-n are attached to the housing and electrically coupled to the transceiver 2176.

The various components of the gNB 2160 are coupled together by a bus system 2111, which may include a power bus, a control signal bus and a status signal bus, in addition to a data bus. However, for the sake of clarity, the various buses are illustrated in FIG. 21 as the bus system 2111. The gNB 2160 may also include a digital signal processor (DSP) 2113 for use in processing signals. The gNB 2160 may also include a communications interface 2115 that provides user access to the functions of the gNB 2160. The gNB 2160 illustrated in FIG. 21 is a functional block diagram rather than a listing of specific components.

Figure 22:
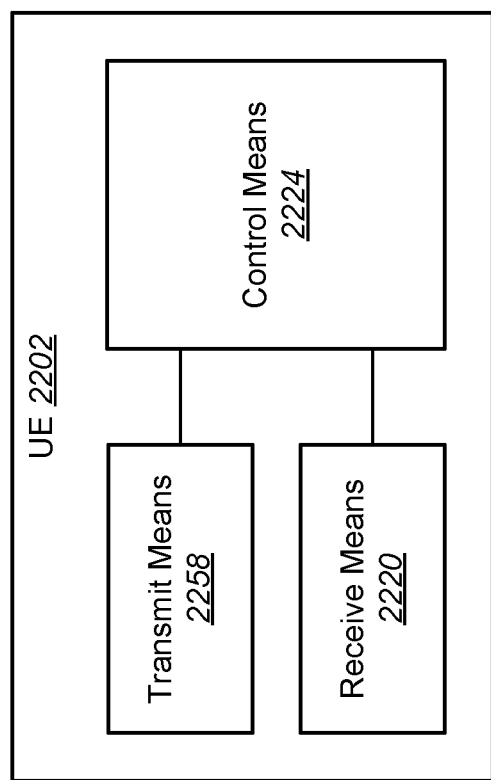
FIG. 22 is a block diagram illustrating one implementation of a UE in which systems and methods for PUCCH collision handling for multi-slot long PUCCH may be implemented.

FIG. 22 is a block diagram illustrating one implementation of a UE 2202 in which systems and methods for PUCCH collision handling for multi-slot long PUCCH in 5G NR may be implemented. The UE 2202 includes transmit means 2258, receive means 2220 and control means 2224. The transmit means 2258, receive means 2220 and control means 2224 may be configured to perform one or more of the functions described in connection with FIG. 1 above. FIG. 20 above illustrates one example of a concrete apparatus structure of FIG. 22. Other various structures may be implemented to realize one or more of the functions of FIG. 1. For example, a DSP may be realized by software.

Figure 23:
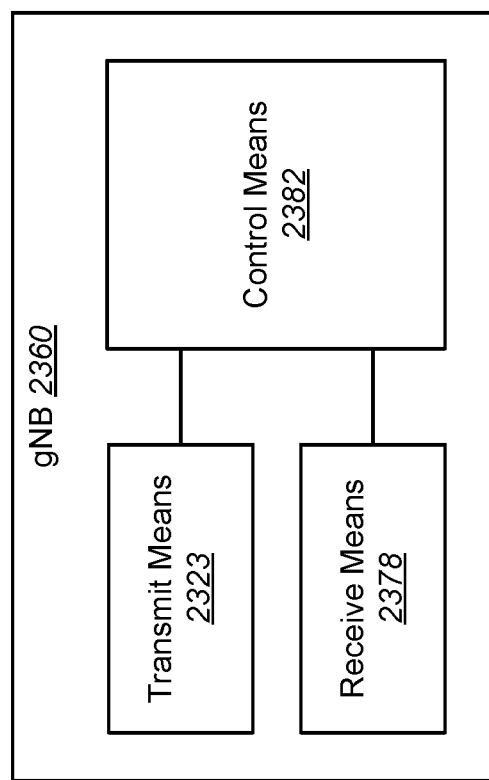
FIG. 23 is a block diagram illustrating one implementation of a gNB in which systems and methods for PUCCH collision handling for multi-slot long PUCCH may be implemented.

FIG. 23 is a block diagram illustrating one implementation of a gNB 2360 in which systems and methods for PUCCH collision handling for multi-slot long PUCCH in 5G NR may be implemented. The gNB 2360 includes transmit means 2323, receive means 2378 and control means 2382. The transmit means 2323, receive means 2378 and control means 2382 may be configured to perform one or more of the functions described in connection with FIG. 1 above. FIG. 21 above illustrates one example of a concrete apparatus structure of FIG. 23. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE) comprising:
a processor configured to determine that a first physical uplink control channel (PUCCH) carrying first uplink control information (UCI) and a second PUCCH carrying second UCI overlap in a slot, the processor being configured to determine, based on a first priority for the first PUCCH and a second priority for the second PUCCH, one of the first PUCCH and the second PUCCH, a priority for the one of the first PUCCH and the second PUCCH being higher than that for the other one of the first PUCCH and the second PUCCH; and
a UL transmitter configured to transmit, in the slot, the one of the first PUCCH and the second PUCCH, without transmitting, in the slot, the other one of the first PUCCH and the second PUCCH, wherein
the first priority for the first PUCCH is based on a type of the first UCI, and the second priority for the second PUCCH is based on a type of the second UCI,
in a case that the type of the first UCI is Channel State Information (CSI) with higher priority and the type of the second UCI is CSI with lower priority, the one of the first PUCCH and the second PUCCH is the first PUCCH and the other one of the first PUCCH and the second PUCCH is the second PUCCH, and
the processor is configured to determine, on the basis of a priority rule in which semi-persistent CSI is defined to have a priority higher than periodic CSI, that the semi-persistent CSI and the periodic CSI are the CSI with higher priority and the CSI with lower priority, respectively.

2. The UE of claim 1, wherein
the first PUCCH is a PUCCH with multi-slot transmission, and
the second PUCCH is another PUCCH with multi-slot transmission.

3. The UE of claim 1, wherein
in a case that the type of the first UCI is Channel State Information (CSI) with higher priority and the type of the second UCI is CSI with lower priority, the one of the first PUCCH and the second PUCCH is determined to be the first PUCCH regardless of a duration of the first PUCCH in the slot and a duration of the second PUCCH in the slot.

4. A base station apparatus comprising:
a processor configured to determine that a first physical uplink control channel (PUCCH) carrying first uplink control information (UCI) and a second PUCCH carrying second UCI overlap in a slot, the processor being configured to determine, based on a first priority for the first PUCCH and a second priority for the second PUCCH, one of the first PUCCH and the second PUCCH, a priority for the one of the first PUCCH and the second PUCCH being higher than that for the other one of the first PUCCH and the second PUCCH; and a UL receiver configured to receive, in the slot, the one of the first PUCCH and the second PUCCH, without receiving, in the slot, the other one of the first PUCCH and the second PUCCH, wherein the first priority for the first PUCCH is based on a type of the first UCI, and the second priority for the second PUCCH is based on a type of the second UCI, in a case that the type of the first UCI is Channel State Information (CSI) with higher priority and the type of the second UCI is CSI with lower priority, the one of the first PUCCH and the second PUCCH is the first PUCCH and the other one of the first PUCCH and the second PUCCH is the second PUCCH, wherein the first PUCCH is received whereas the second PUCCH is not received on the basis of (a) a priority rule in which semi-persistent CSI is defined to have a priority higher than periodic CSI and (b) a determination by a user equipment that the semi-persistent CSI and the periodic CSI are the CSI with higher priority and the CSI with lower priority, respectively.

5. The base station apparatus of claim 4, wherein
the first PUCCH is a PUCCH with multi-slot transmission, and
the second PUCCH is another PUCCH with multi-slot transmission.

6. The base station apparatus of claim 4, wherein
in a case that the type of the first UCI is Channel State Information (CSI) with higher priority and the type of the second UCI is CSI with lower priority, the one of the first PUCCH and the second PUCCH is determined to be the first PUCCH regardless of a duration of the first PUCCH in the slot and a duration of the second PUCCH in the slot.

7. A communication method of a user equipment comprising:

determining that a first physical uplink control channel (PUCCH) carrying first uplink control information (UCI) and a second PUCCH carrying second UCI overlap in a slot;

determining, based on a first priority for the first PUCCH and a second priority for the second PUCCH, one of the first PUCCH and the second PUCCH, a priority for the one of the first PUCCH and the second PUCCH being higher than that for the other one of the first PUCCH and the second PUCCH;

transmitting, in the slot, the one of the first PUCCH and the second PUCCH, without transmitting, in the slot, the other one of the first PUCCH and the second PUCCH, wherein the first priority for the first PUCCH is based on a type of the first UCI, and the second priority for the second PUCCH is based on a type of the second UCI, and in a case that the type of the first UCI is Channel State Information (CSI) with higher priority and the type of the second UCI is CSI with lower priority, the one of the first PUCCH and the second PUCCH is the first PUCCH and the other one of the first PUCCH and the second PUCCH is the second PUCCH;

determining, on the basis of a priority rule in which semi-persistent CSI is defined to have a priority higher than periodic CSI, that the semi-persistent CSI and the periodic CSI are the CSI with higher priority and the CSI with lower priority, respectively.

8. A communication method of a base station apparatus comprising:

determining that a first physical uplink control channel (PUCCH) carrying first uplink control information (UCI) and a second PUCCH carrying second UCI overlap in a slot;

determining, based on a first priority for the first PUCCH and a second priority for the second PUCCH, one of the first PUCCH and the second PUCCH, a priority for the one of the first PUCCH and the second PUCCH being higher than that for the other one of the first PUCCH and the second PUCCH; and receiving, in the slot, the one of the first PUCCH and the second PUCCH, without receiving, in the slot, the other one of the first PUCCH and the second PUCCH, wherein the first priority for the first PUCCH is based on a type of the first UCI, and the second priority for the second PUCCH is based on a type of the second UCI, in a case that the type of the first UCI is Channel State Information (CSI) with higher priority and the type of the second UCI is CSI with lower priority, the one of the first PUCCH and the second PUCCH is the first PUCCH and the other one of the first PUCCH and the second PUCCH is the second PUCCH, wherein the first PUCCH is received whereas the second PUCCH is not received on the basis of (a) a priority rule in which semi-persistent CSI is defined to have a priority higher than periodic CSI and (b) a determination by a user equipment that the semi-persistent CSI and the periodic CSI are the CSI with higher priority and the CSI with lower priority, respectively.

* * * * *